(12) United States Patent
Yaovaphankul

(10) Patent No.: US 12,629,701 B2
(45) Date of Patent: May 19, 2026

(54) COMPACT DISC STACK CYCLONE SEPARATOR

(71) Applicant: Luxnara Yaovaphankul, Samut Prakarn (TH)

(72) Inventor: Luxnara Yaovaphankul, Samut Prakarn (TH)

(73) Assignee: Luxnara Yaovaphankul, Samut Prakarn (TH)

( * ) Notice: Subject to any disclaimer, the term of this patent is extended or adjusted under 35 U.S.C. 154(b) by 484 days.

(21) Appl. No.: 18/041,629

(22) PCT Filed: Dec. 24, 2021

(86) PCT No.: PCT/IB2021/062284
§ 371 (c)(1),
(2) Date: Feb. 14, 2023

(87) PCT Pub. No.: WO2022/144739
PCT Pub. Date: Jul. 7, 2022

(65) Prior Publication Data
US 2023/0302468 A1 Sep. 28, 2023

(30) Foreign Application Priority Data

Dec. 30, 2020 (TH) ................................ 2001007538

(51) Int. Cl.
*B04C 5/103* (2006.01)
*B01D 45/14* (2006.01)
(Continued)

(52) U.S. Cl.
CPC .............. *B04C 5/103* (2013.01); *B01D 45/14* (2013.01); *B01D 45/16* (2013.01); *B04C 5/04* (2013.01);
(Continued)

(58) Field of Classification Search
CPC ........... C02F 1/38; B01D 45/14; B01D 45/16; B01D 21/0057; B04C 5/103; B04C 5/04;
(Continued)

(56) References Cited

U.S. PATENT DOCUMENTS

| | | |
|---|---|---|
| 4,373,228 A | 2/1983 | Dyson |
| 9,451,859 B2 | 9/2016 | Gammack et al. |

(Continued)

FOREIGN PATENT DOCUMENTS

| | | |
|---|---|---|
| CN | 101528355 A | 9/2009 |
| CN | 102481587 A | 5/2012 |

(Continued)

OTHER PUBLICATIONS

International Search Report issued in corresponding International Application No. PCT/IB2021/062284 mailed Apr. 26, 2022 (6 pages).

(Continued)

*Primary Examiner* — Akash K Varma
(74) *Attorney, Agent, or Firm* — Osha Bergman Watanabe & Burton LLP

(57) ABSTRACT

A compact disc stack cyclone separator includes: a fluid inlet; a vortex generator which generates a forced vortex; a conical or cylindrical vortex generating chamber; a separation chamber which is a cavity formed by downstream open ends of stacked truncated cones; narrow gaps between the stacked truncated cones, a collecting channel for heavy phrase fluid from the gaps between the stacked truncated cones which installed about the outlets of the gaps at upstream open end of the stacked truncated cones to channel heavy phrase fluid to a storage chamber of heavy phrase fluid; and an outlet for heavy phrase fluid to flow out from the storage chamber of heavy phrase fluid, while the outlet of light phrase fluid is annexed to the downstream open end (Continued)

of the last stacked truncated cone which is the downstream open end of separation chamber.

9 Claims, 18 Drawing Sheets

(51) Int. Cl.

| | |
|---|---|
| *B01D 45/16* | (2006.01) |
| *B04C 5/04* | (2006.01) |
| *B04C 5/06* | (2006.01) |
| *B04C 5/13* | (2006.01) |
| *B04C 5/187* | (2006.01) |
| *B04C 5/26* | (2006.01) |
| *B04C 5/28* | (2006.01) |
| *B04C 9/00* | (2006.01) |
| *C02F 1/38* | (2023.01) |

(52) U.S. Cl.
CPC .................. *B04C 5/06* (2013.01); *B04C 5/13* (2013.01); *B04C 5/187* (2013.01); *B04C 5/26* (2013.01); *B04C 5/28* (2013.01); *B04C 9/00* (2013.01); *C02F 1/38* (2013.01); *B04C 2009/004* (2013.01); *B04C 2009/005* (2013.01); *B04C 2009/007* (2013.01)

(58) Field of Classification Search
CPC .. B04C 5/06; B04C 5/13; B04C 5/187; B04C 5/26; B04C 5/28; B04C 9/00; B04C 2009/004; B04C 2009/005; B04C 2009/007; B04C 2009/008; B04C 2003/003; B04C 2003/006; B04C 3/04; B04C 3/06; B04C 3/00; B04C 7/00

USPC ...................................................... 210/512.2
See application file for complete search history.

(56) References Cited

U.S. PATENT DOCUMENTS

| | | | |
|---|---|---|---|
| 2006/0230724 A1 | 10/2006 | Han et al. | |
| 2010/0139492 A1* | 6/2010 | Fichman ............... | B01D 45/16 |
| | | | 96/319 |
| 2012/0118818 A1* | 5/2012 | Moraes .................... | B04C 5/04 |
| | | | 210/512.1 |
| 2015/0136261 A1* | 5/2015 | Yoavaphankul ........ | F02B 31/00 |
| | | | 137/812 |
| 2017/0292545 A1* | 10/2017 | Yoavaphankul ...... | F15D 1/0015 |
| 2018/0161785 A1* | 6/2018 | Yoavaphankul .......... | B04C 3/04 |
| 2019/0321756 A1* | 10/2019 | Kompala ........... | B01D 21/0057 |

FOREIGN PATENT DOCUMENTS

| | | |
|---|---|---|
| CN | 204412476 U | 6/2015 |
| WO | 2014/104988 A1 | 7/2014 |
| WO | 2016/053207 A1 | 4/2016 |
| WO | 2016/195602 A1 | 12/2016 |
| WO | 2019/204044 A1 | 10/2019 |

OTHER PUBLICATIONS

Written Opinion issued in corresponding International Application No. PCT/IB2021/062284 mailed Apr. 26, 2022 (6 pages).

* cited by examiner r 245
249
243
247

244

241

246

245'
249'
243'
247'

244'

241'
252
246'

COMPACT DISC STACK CYCLONE SEPARATOR

FIELD OF THE INVENTION

The present invention relates to a compact disc stack cyclone separator.

BACKGROUND OF THE INVENTION

The use of cyclone separators has been around for over a hundred years. Over the past 20 years, cyclone separators have been introduced and widely used as common appliances in household such as vacuum cleaners, for example, a vacuum cleaner according to U.S. Pat. No. 4,373,228A. This is because a cyclone separator is easy for maintenance, just remove and empty the dust collection tray, unlike traditional vacuum cleaners that use cloth bags. The cloth bag is easily clogged, when it is clogged, the suction and dust extraction efficiency decrease rapidly, and when the cloth bag is removed for cleaning, it will cause the dust to spread out, not hygienic therefore affecting health, as well as the case of using the filter screen, it has to be replaced periodically, which is wasteful.

However, the use of a cyclone separator in a vacuum cleaner still has a weakness that it is impossible to completely separate the fine dust contaminated in the air before releasing the air passing through the vacuum back into the ambient surrounding. This requires multiple cyclones to be placed in multiple layers, resulting in a big and bulky cyclone vacuum cleaner. Examples can be seen according to the Patent number US2006/0230724A1 and US9451859B2, a cyclone separator has low efficiency in separating fine dust because it creates a swirling from a tangential inlet of the cyclone separator. The swirling flows toward its centre and the swirling flow speed increases as the swirling flows toward its centre, this type of swirling called a free vortex. Since the centrifugal force is varies proportional to the velocity of the vortex, therefore the centrifugal force of free vortex is low at the outer circumference of the vortex and it is high at the inner circumference of the vortex. The fluid containing smaller or less density particles (light phase fluid), therefore circulates in the outer circumference of the vortex which is the field with lower centrifugal force and the fluid containing larger or higher density particles (heavy phase fluid) circulates in the inner circumference of the vortex. When the vortex flows near to the bottom outlet of the cyclone, a reverse vortex occurs and is transformed into a forced vortex. At the point of reverse vortex occurred is the separation point of the fluid. At this point, the outermost circumference of the vortex is the light phase fluid resulting from the free vortex. The subsequent circumference is the heavy phase fluid, and the innermost circumference is the light phase fluid resulting from the forced vortex from the reverse vortex. Therefore, at the separating point, both light phase and heavy phase fluids are removed through the bottom outlet of the cyclone. When using a traditional cyclone fluid separator in the vacuum cleaner, problems will occur. That is, it cannot completely separate fine dust, has low separation efficiency, thus requires many cyclone separators that results a big and bulky vacuum cleaner.

SUMMARY OF THE INVENTION

The compact disc stack cyclone separator according to the present invention comprises an inlet to feed fluid into the separator, a fluid distribution chamber, a device for generating a forced vortex with a laminar swirling flow, a vortex generating chamber, stacked truncated cones with upstream and downstream open ends installed longitudinally axially next to the vortex generating chamber wherein each cone is mounted separately apart from each other to form a narrow gap between the cones to increase surface settling area, a fluid collection channel for heavy phase fluid that is located at the bottom opening of the stacked cones, next to the collection channel for heavy phase fluid is a fluid storage chamber for heavy phase fluid, an outlet to release heavy phase fluid from the separator, at the open end of the last stacked cone is the outlet for removal of light phase fluid from the separator.

The fluid enters into the separator of the present invention either through an axial inlet or a tangential inlet of the separator, either by means of a pressure via the upstream inlet or suction through the downstream outlet or use both methods at the same time.

When the fluid enters into the separator of the present invention, it is collected in the fluid distribution chamber to distribute into the device for generating vortex. The device for generating vortex is a transmission base with a conical or cylindrical shape having the internal cavity of the configuration, with multiple through holes arranged symmetrically around the transmission base. Beside a through hole is a through hole side edge block. at the entrance of though hole there is a wall of though hole side edge block to guide fluid into the through hole. at the outlet of the through hole inside internal cavity of transmission base, there will be a wall of through hole side edge block is in shape of a convex curve edge surface that curved toward the inner wall of the transmission base. The other side of the wall of through hole side edge block at the entrance of through hole is in a straight-line edge surface directed to the through hole, wherein the convex curve edge surface that curved toward the inner wall of the transmission base, will be the surface closest to the emerging axis of the through hole. When fluid with a certain pressure and/or a certain suction force flows through the through hole, it will be deflected by the Coanda effect (ejecting fluid has tendency to flow into the nearest wall surface and flow along the wall, even if the wall surface deviates from the ejecting flow line of the emerging axis of the through hole. Consequently, this area will have a lower pressure, thus causing the surrounding fluid to flow inward and then flow attaching to the wall surface) to flow along the convex curve edge surface that curved toward the inner wall of the transmission base and induces the fluid in the internal cavity of the transmission base that is a part of the chamber for generating vortex to flow inward and flow along the convex curve edge surface that curved toward the inner wall of the transmission base. Due to the convex curve edge surface that curved toward the inner wall of the transmission base causes the fluid to flow attaching to the inner wall of the transmission base. The symmetrical arrangement of the through holes to both external and internal walls around the transmission base and the symmetrical arrangement of the convex curved edge surface and the emerging axis of the through holes around the inner wall of the transmission caused the flow of each convex curve surface flow in relay of each other to causes a flow on the inner wall of the internal cavity create a swirling flow in the cavity. By the Coanda effect it create a lamina swirling flow. As the dynamic force is highest at the contact point of the convex curve edge surface and the inner wall circumference of the transmission base, the velocity of vortex is highest at the convex curve edge surface which is the outermost circumference of the vortex and the velocity of vortex will gradually decrease as the flow approaches the centre of the vortex. Since the centrifugal force directly varies with the velocity of the vortex. The centrifugal acceleration gradient profile generated by the forced vortex, the centrifugal force is highest at the outermost circumference, then decreases gradually as it approaches the centre of the vortex. For the fluid particle distribution when come under centrifugal force, heavy phase fluid receive greater centrifugal force thrown to flow on the outer circumference of the flow while the light phase fluid receive lower centrifugal force will be circulated in the inner circumference. Since the vortex created from the separator according to the present invention is laminar swirling flow, so the particles are easily separated in layers of distribution according to their density or morphological size, large or small, in corresponding to the generated centrifugal acceleration gradient profile.

The vortex generating chamber or part of the vortex generating chamber is a cone shape. The circumference is continually shortened along the length of the axial direction of the cone, therefore the acceleration of the swirling velocity and the centrifugal force increase along the axial direction. The fluid flow formed a forced vortex with laminar swirling flow by the device for generating vortex, when swirl in the vortex generating chamber will accelerate the swirling and increase the centrifugal force. When the centrifugal force is increased, it will result in a clear layers of separation of fluid. The heavy phase fluid is separated into the outer circumference of the vortex, while the light phase fluid will flow in the inner circumference of the vortex. Next to the conical vortex generating chamber, there are stacked truncated cones with upstream and downstream open ends. Each cone has protrusions to separate the cones into narrow gap between the cones to increase the surface settling area. When the fluid swirl from the vortex generating chamber to the first stacked cone with a narrow gap between the cones of the vortex generating chamber and the stacked cones, the circumference of vortex increases suddenly due to the longer radius of the next cone. The outer layer of the vortex consisting of heavy phase fluid is thrown to the inner wall of the next cone and swirl downward through the bottom outlet of the cone to the collection channel for heavy phase fluid, which is the gap underneath the upstream open end of the stacked cones, which is the gap between the cone cover and the stacked cones. The light phase fluid originally swirl in the inner circumference will then swirl on the outer circumference of the vortex, which swirl along the next part of the inner wall of the cone and continues to swirl through the upper open end of the cone. When it swirl pass the inner wall of the first cone, the heavy phase fluid (compare with all swirling fluid) will be thrown to swirl along the inner wall of the next cone. This process will repeat as mentioned above and will repeat multiple times according to the number of the stacked cones until it reaches the downstream open end of the final cone. This is to separate the heavy phase fluid out from every cone that the fluid swirl through and the remaining fluid will result in smaller or less dense particle fluid until obtaining light phase fluid as intended.

The stacked cones may be designed to be smaller at the open end of the downstream cone than the open end of the upstream cone. The open ends of stacked cones are gradually smaller as stacked along the longitudinal length of the axis to the last cone so that the internal cavity of the stacked cones is in conical shape. This enable to distribute the fluid through all of the narrow gaps between the cones. When the heavy phase fluid swirl though the gap between the cones, the fluid will further swirl along the inner wall of the structure inside the cone that covers the stacked cones. Some parts of the fluid that flows along the wall of stacked cones and the internal wall of the cones that cover the stacked cones are sedimented down to the storage chamber of heavy phase fluid which is the gap between the conical or cylindrical external structures with a conical internal structure that covers the stacked cones. The heavy phase fluid in the fluid storage chamber can be released through an outlet that may equip with an valve, which may be released occasionally or continuously.

The walls of the fluid storage chamber for heavy phase fluid either on the upper ceiling or the side wall can be equipped with an outlet with filter screen on the walls of the external structure to filter the heavy phase fluid (contaminated) prior to discharge from the separator. At the outlet for the light phase fluid or may be referred to as clean fluid outlet, at the open end of the last stacked cones. The outlet may be fitted with a round tube with a cap seal that closes the straight end outlet and open the lateral outlet to reduce the axial flow and to deviate to flow out through the lateral outlet to help to stabilize the swirling flow in the vortex generating chamber to obtain higher separation efficiency.

The stacked cones in the separator can be either solid-wall cone or Coanda screen cone. The Coanda screen cone comprises a conical structure with the wall covered with wedge wire. The wedge wire has a triangular cross-sectional plane fixed longitudinally to cone structure with narrow gap between each wedge wire. The gap space between the wedge wire is the same along the wire. The wedge wire is arranged around the cone with the flat side facing inward to be the inner wall, while the triangular side faces outward to be the outer wall of the cone. Because of the curvature of the circumference of the cone, the flat side of the next wedge wire is in an uprisen angle from the flattened side of the preceding wedge wire (along the swirling direction) to cause the straight flow line from the flat side of the preceding wedge wire to flow to the wall of the triangle side of the next wedge wire. The heavy phase fluid swirling on the outer circumference of the vortex come under the centrifugal force receiving centrifugal force at greater rate will flow attaching to the flat surface of the wedge wire, then by Coanda effect flows straight to the wall of the triangle side of the next wedge wire, subsequently flows out the Coanda screen cone and flows into the gap between the present cone and the next cone and flows into the fluid collection channel for heavy phase fluid. The light phase fluid receive centrifugal force at lower rate will flows inside of the vortex will flow from the flat surface of the preceding wedge wire to the flat surface of the next wedge wire, then flow inside the Coanda screen cone, and then swirl axially to the next part of the Coanda screen cone. The light phase fluid swirling in the cone in the gap between the cones will entrained to the new coming fluid to flow back to the downstream open end. The process of separating the heavy phase fluid from the light phase fluid, known as the contaminant separation, occurs repeatedly at all layers of the stacked Coanda screen cones. Since the gap between the wedge wire of the outer wall is larger than the wedge wire gap of the inner wall of the cone, the Coanda screen is not easily clogged.

The compact disc stack cyclone separator according to the invention can be developed into another version that does not require a filter screens or filter elements to filter the heavy phase fluid left over from sedimentation before being released from the separator at the outlet above the storage chamber for heavy phase fluid. By cancelling the aforementioned outlet and closes the light phase fluid outlet that is originally at the downstream outlet of the last stacked cone form a partition wall above the lower edge of the conical internal structure to separate the storage areas for heavy phase fluid, and to expand the external structure to be higher above the conical internal structure, all space generated by the above remodelling will be the space for subsequent separation of the pre-screened fluid.

The space for subsequent separation of the pre-screened fluid consists of several small cyclone separators symmetrically mounted on the periphery of the inner structure covering the stacked cones, with a fluid inlet from the collection chamber for heavy phase fluid. The fluid inlet is located above the bottom open end of the last stacked cone. This is to bring the unsettled fluid from the sedimentation into the fluid distribution chamber to each small cyclone separator. The small cyclone separator has an inverted cone shape. The small cyclone separator consists of a device for generating a forced vortex with a laminar swirling flow that uses the Coanda effect principle, a fluid outlet for separated heavy phase or contaminant fluid at the bottom of the cyclone cone. The removed particles are stored in the storage chamber, an outlet that may have a valve to release the separated particles from the separator, a vortex finder is centred on the top of the cyclone cone, which is a light phase fluid outlet (the fluid has been purified) flows out from the cyclone, the common outlet centred on the top of the outer structure to remove the purified fluid from each small cyclone from the separator.

The device for generating vortex of a small cyclone separator is a device for generating a forced vortex with a laminar swirling flow that uses the Coanda effect principle, in which is the transmission base in inverted cone or cylindrical shape having internal cavity, preferably is inverted cone shape. Around the transmission base of the device for generating vortex, multiple through holes are installed symmetrically to guide the external fluid into the inner cavity of the transmission base. Beside the through hole, there will be the through hole side edge block. One side of the edge at the outlet of the through hole inside internal cavity is a convex curved edge surface that curved toward the inner wall of the transmission base which is the nearest surface to the emerging axis of the through hole, in comparison with another though hole side edge surface, the edges of the through holes and through holes are installed symmetrically around the inner wall of the transmission base of the device for generating vortex.

When the fluid is separated from the stacked cones, the heavy phase fluid swirl attaching the settling surface area which is the wall of stacked cones, and the inner structural wall of the cone that covers the stacked cones are sedimented and collected to be stored in the storage chamber below. The light phase fluid (or the fluid with fine contaminants) that is not sedimented will flow upward above the fluid collection channel. It then flows into the inlet that leads into the fluid distribution chamber of small cyclones that are symmetrically installed around the internal cone structure that covers the stacked cones. The fluid in the fluid distribution chamber is distributed to the transmission base of the device for generating vortex. By arranging the through hole with the convex curve edge surface that curved toward the inner wall of the transmission base and the emerging axis of the through hole in accordance with the Coanda profile. The fluid will deflect to flow along the convex curve edge surface that curved toward the inner wall of the transmission base and induces the fluid in the internal cavity of the transmission base, which is a part of the chamber for generating vortex to flows inward and flows attaching along the convex curve edge surface that curved toward the inner wall of the transmission base. The symmetrical arrangement of the multiple through holes to both external and internal walls around the transmission base and the symmetrical arrangement of the convex curve edge surface and the emerging axis of the through holes around the inner wall of the transmission base cause the flowing fluid to flow attaching the convex curve edge surface that curved toward the inner wall of transmission base, which flow in relay to each other thus flow on the inner wall of the chamber for generating a forced vortex with a laminar swirling flow. As the dynamics energy is highest at the contact point of the convex curve edge surface and the circumference of the inner wall of the vertex generating chamber, the velocity of the swirling flow thus is highest at the convex curve edge surface, which is the outermost circumference of the vortex, and the velocity of the swirling will decreases when approaches the center of the vortex in corresponding to the decreasing dynamics energy such vortex is a forced vortex. Since the centrifugal force directly varies with the velocity of the vortex. As the centrifugal acceleration gradient profile is generated by the forced vortex, the centrifugal force is highest at the outermost circumference, then decreases gradually as it approaches the centre of the vortex, in accordance with the particle distribution when come under the centrifugal force, that is the heavy phase fluid receive centrifugal force at higher rate is thrown to flow in the outer circumference. The light phase fluid that receive a lower rate of centrifugal force will flow in the inner circumference, the vortex generated by the vortex generating device of the small cyclone separate according to the present invention is laminar swirling flow. Therefore the particles are separated in layers of distribution of density or size according to the centrifugal acceleration gradient profile, so that it is easy to separate. Because the small cyclone have a short diameter therefore generating high vortex velocity which imply to generate a high centrifugal force, and the short cyclone radius causes the particles to be easily centrifuged to flow attaching along the wall of the cyclone cone causing a high rate of sedimentation from centrifugal forces, thus the separation of fine contaminants is highly efficient, with the circumference of cyclone gradually shorten longitudinally, the generated high velocity vortex flows in the conical chamber for generating vortex will gradually increase along the cone to the end opening (downstream opening), which is the fluid outlet of the heavy phase fluid, also known as the fine contaminants contaminated in the fluid, wherein the cross-sectional area of the bottom outlet is smaller than the total cross-sectional area of the through holes of the device for generating vortex of the small cyclone separator, which is the channel to bring fluid flows into the cyclone separator causing more fluid to enter than the bottom outlet can release, thus a reverse flow occurs. Since the vortex produced is a forced vortex, a fluid with heavy phase fluid (also known as fine contaminants in the fluid) is separated at the bottom outlet into the storage chamber for heavy phase fluid (or as fine contaminants in the fluid) having an outlet with valve to remove fine contaminants from the separator. While the light phase fluid (also known as the purified fluid) will swirl up to the top of the cyclone cone. At the center of the bottom outlet a conical apex body can be installed to assist the reverse of the swirling. At the center of the upper wall of the cone will be fitted with the vortex finder to allow the fluid to entrain and swirl out from the separator. At the outlet of the vortex finder may be fitted with a round tube with a cap seal, blocking the straight outlet and opening the side outlet to block the straight flow and deflect the flow through the side outlet, to stabilize the vortex in the chamber for generating vortex for better separation efficiency. The purified fluid from all the small cyclone separators will be gathering in the lights phase fluid collection channel Then to be sucked or pushed out through the fluid outlet for light phase fluid (or the purified fluid) to release from the compact disc stack cyclone separator according to the present invention.

The objective of this invention is to create a cyclone separator with high separation efficiency and compact size, suitable to use in vacuum cleaners, especially portable vacuum cleaners, air filters in air conditioners or air filter in internal combustion engines, water purifiers, fluid separators in various industries. With a device for creating vortex of the cyclones separator according to the present invention that creates a forced vortex type vortex with laminar swirling flow. The vortex velocity is highest at the outer circumference of the vortex and the velocity decreases as it approaches the centre of the vortex. Since the centrifugal force directly varies with vortex flow velocity, the centrifugal acceleration gradient profile obtained from the generated forced vortex corresponds to the distribution of the fluid particles when come under the centrifugal force. That is heavy phase fluid which is receive higher centrifugal force will circulate in the outer circumference, while light phase fluid receive lower centrifugal force will circulate in the inner circumference of the vortex and clearly separated into layers of distribution thus easy to separate. Therefore, the separation efficiency of the fluid separator according to the present invention is higher than conventional cyclone separators. The conventional cyclone fluid separators create the vortex by the tangential inlet of the cyclone, resulting in the free vortex type vortex and will swirl toward the centre of the vortex and the velocity of the vortex increases gradually. The velocity is highest at the centre of the vortex, which is opposed to the distribution of particles when come under the centrifugal force. The vortex of conventional cyclone fluid separator will turn into a forced vortex type vortex when the vortex flow reversely. At the point of reverse flow, this will be the separation point of the fluid. The outermost circumference of the vortex is the light phase fluid resulting from the original free vortex. The next layer will be a layer of heavy phase fluid. Then, subsequently, the further next layer is the light phase fluid resulting from reserve flow forced vortex. At the separation point, thus separating both the small particles in the outermost layer and the larger particles in the subsequent layer via the bottom outlet of the cyclone. As a result, the conventional cyclone fluid separators that is used to separate dust or used in vacuum cleaners will also release fine dust. This is resulted low separation efficiency in the cyclone fluid separators. Since the cyclone fluid separator according to this invention is able to create a forced vortex flow in axial direction, therefore, the cones can be stacked in axial direction to increase surface settling area. One cone is equal to a cyclone separator, therefore, multiple stacking significantly increases the surface settling area. This is to greatly increase the separation efficiency by the stacked cones in layers along the axis. Therefore, the cones can be stacked in multiple layers with limited space. Thus, the cyclone separator with the stacked cones of this invention is in compact size.

DETAILED DESCRIPTION OF THE INVENTION

The compact disc stack cyclone separator according to the present invention comprises: a fluid inlet, a device for generating a forced vortex with a laminar swirling flow, a conical or cylindrical vortex generating chamber, stacked truncated cones with upstream and downstream open ends wherein each stacked cone has protrusions to separate the cones providing the narrow gap between the cones to increase the surface settling area, a fluid collection channel for heavy phase fluid located at the bottom outlet of the stacked cones, outlet for heavy phase fluid, and an outlet for light phase fluid at the downstream open end of the last cone of the stacked cones.

The compact disc stack cyclone separator as mentioned above can be used with a device for generating vortex that is guide vane or impeller mounted at the axial fluid inlet in front of the chamber for generating a forced vortex with a laminar swirling flow.

The compact disc stack cyclone separator according to the present invention that uses the device for generating a forced vortex with a laminar swirling flow that uses the Coanda effect principle will be discussed hereinafter.

Figure 1:
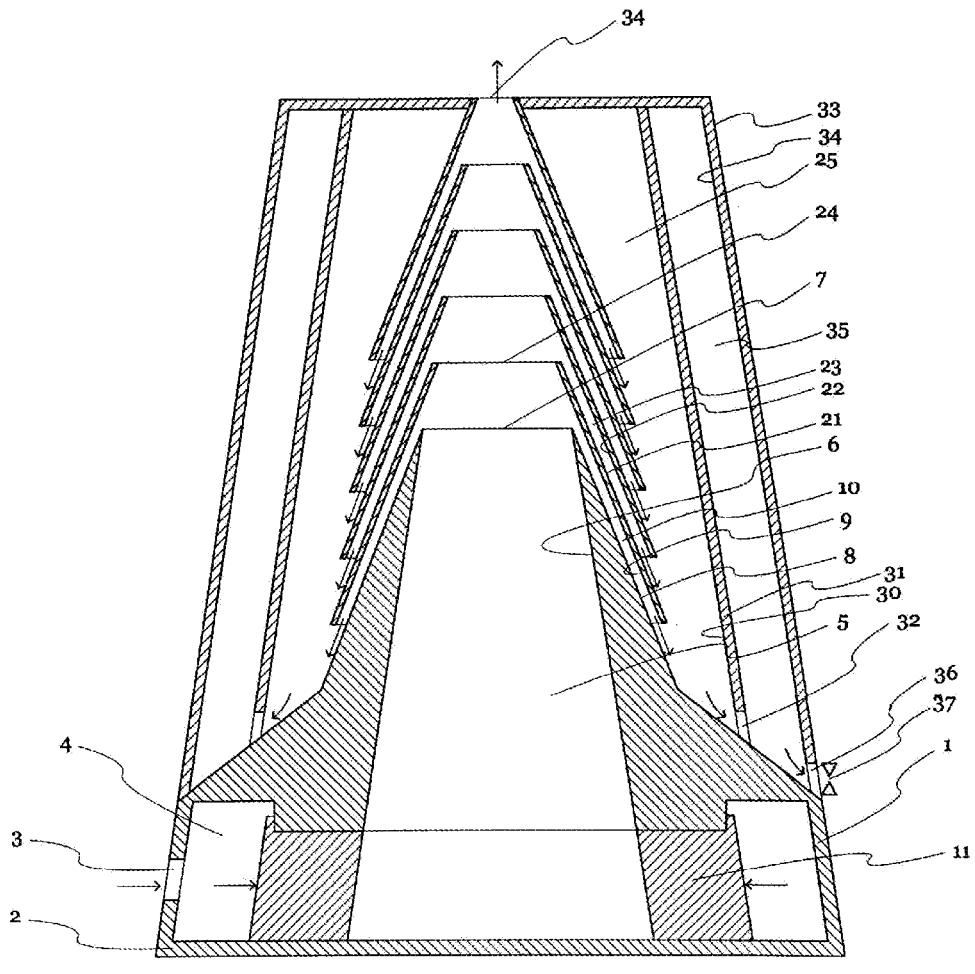
FIG. 1 shows the compact disc stack cyclone separator.

FIG. 1 shows a compact disc stack cyclone separator according to the present invention comprises: an inlet 3 to guide fluid into the separator, a device for generating vortex 2 including a fluid distribution chamber 4, a transmission base 11, a device for generating vortex that uses the Coanda effect principle which create a laminar swirling flow, a conical vortex generating chamber 5, stacked truncated cones (at least one cone 21) with upstream and downstream open ends with protrusions on the cone wall to separate each cone with narrow gap (at least one gap 10) between the cones to increase the surface settling area, a fluid collection channel 25 for heavy phase fluid, a storage chamber 35 for heavy phase fluid, an outlet for heavy phase fluid 36, and an outlet 34 for releasing light phase fluid.

Figure 2:
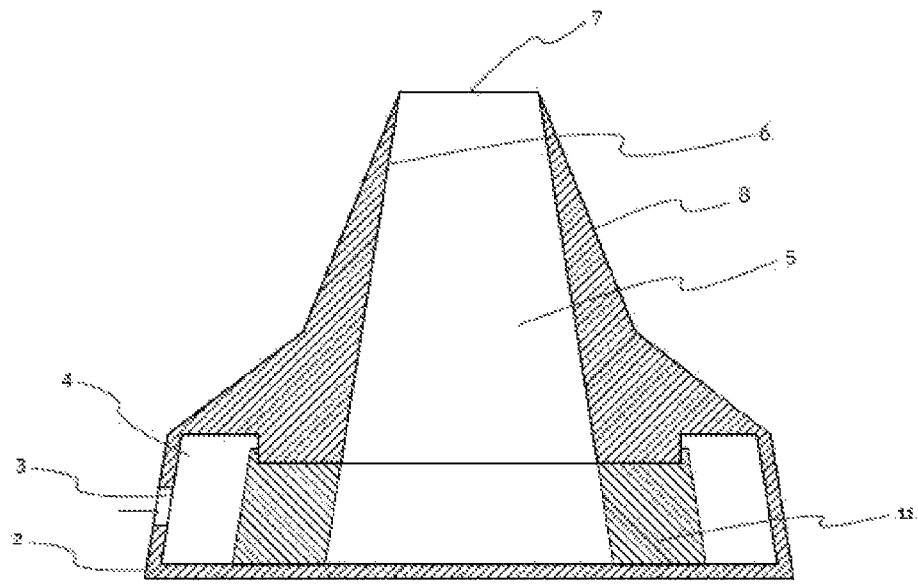
FIG. 2 shows a device for generating vortex with tangential fluid inlet.
Figure 3:
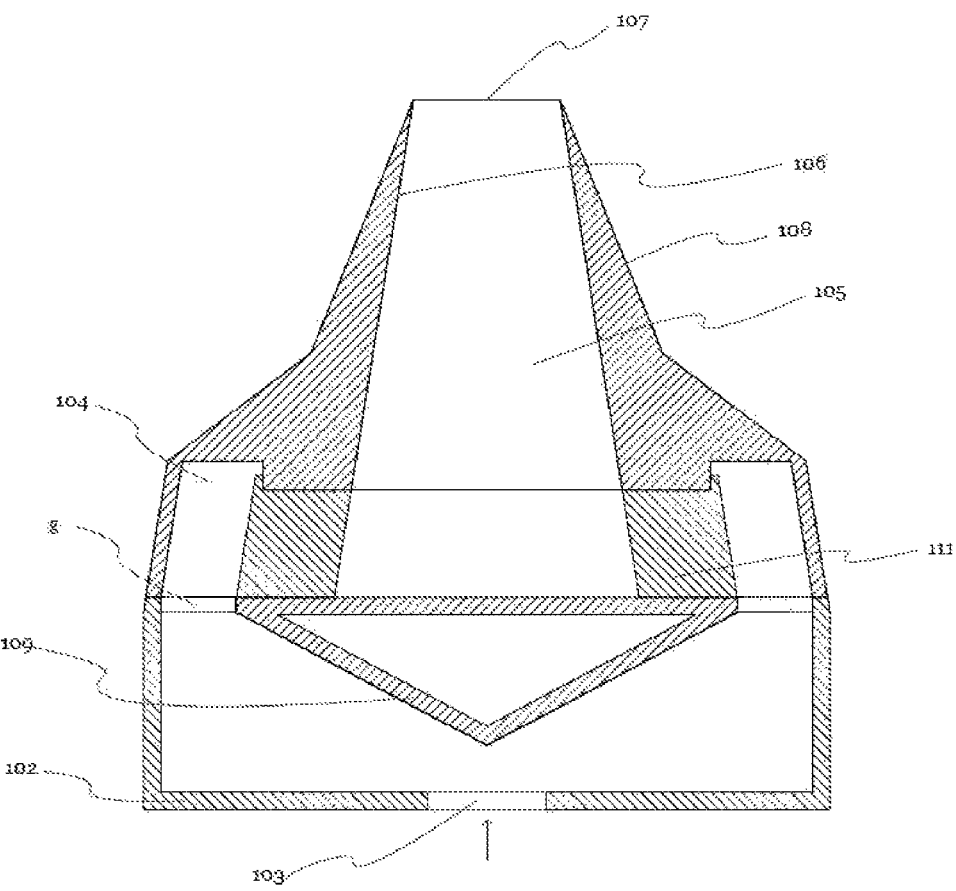
FIG. 3 shows a device for generating vortex with axial fluid inlet.

FIG. 2 shows the introduction of the fluid into the separator according to the present invention, the fluid can enter via a tangential inlet 3 of the separator or an axial inlet 103 of the separator according to FIG. 3. The fluid can be imported by using an upstream pressure or a suction force of the downstream outlet or both methods at the same time.

According to FIG. 1, when the fluid to be separated is directed into the separator 1 according to the present invention, it is collected in the fluid distribution chamber 4 of the device for generating vortex 2 to distribute the fluid into the transmission base 11.

Figure 4:
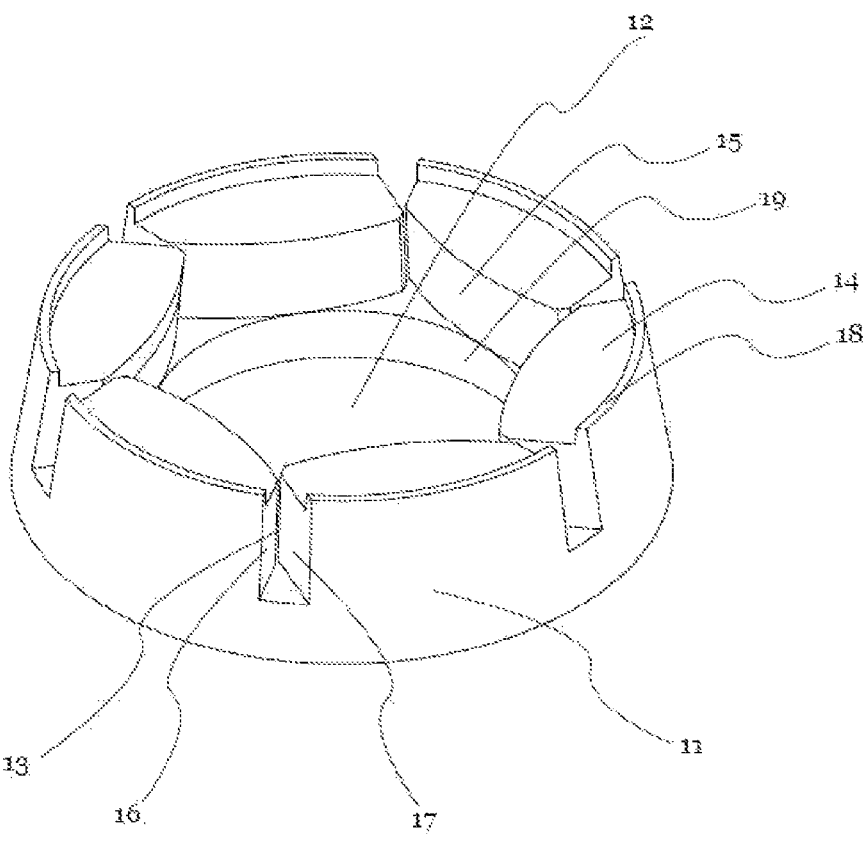
FIG. 4 shows a transmission base of the device for generating vortex.

According to FIG. 4, the device for generating vortex consists of the transmission base 11 with a conical or cylindrical shape, an internal cavity 12 in corresponding to the configuration of transmission base, through holes 13 providing multiple narrow vertical rectangle gaps located symmetrically around the transmission base 11, beside the through holes 13 there are though hole side edge block 14 and an edge wall 16 at the entrance to a through hole. Where a through hole 13 passes into the internal cavity 12 the wall of though hole side edge block will be a convex curve edge surface 15 that curved toward the inner wall of the transmission base. The hole side edge wall on the opposite side of the edge wall 16 is the edge wall 17. The gap between the edge wall 16 and the edge wall 17 is wide opened at the entrance, then narrow down at the through hole 13 to facilitate for gathering the fluid to flow through the through hole 13. The through hole 13 will not aligned with the edge wall 16, but aligned with the edge wall 17 which is the emerging axis a of the through hole according to FIG. 5.

Figure 5:
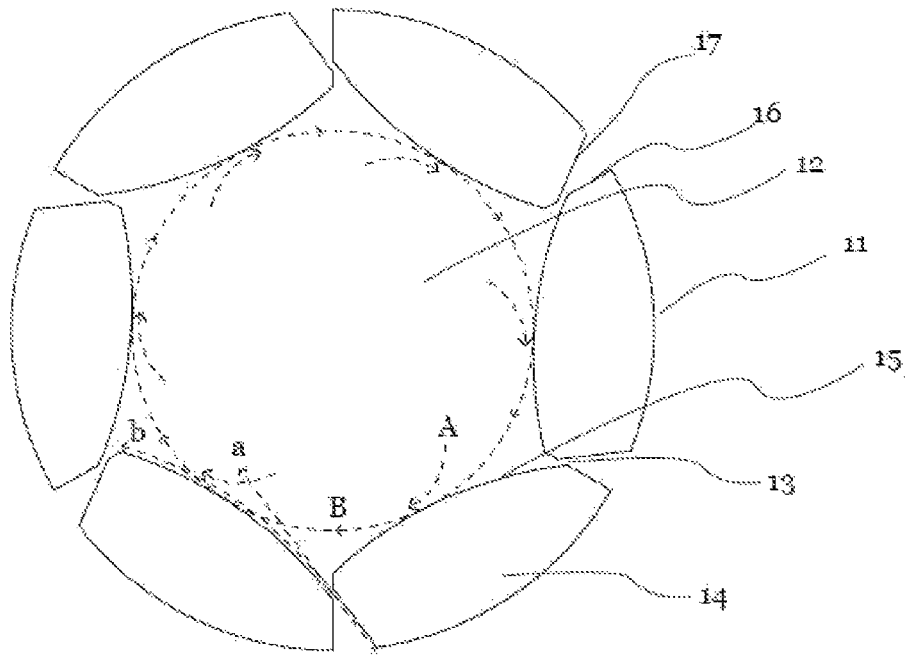
FIG. 5 shows an operation layout of the transmission base of device for generating vortex.

According to FIG. 5, the convex curve edge surface 15 that curved toward the inner wall of the transmission base arranged to be the surface closest to the emerging axis of the through hole in compared with the other edge wall beside the outlet of through hole. When fluid with a certain pressure and/or a certain suction force flows through the through hole 13, it is deflected by the Coanda effect to flow attaching to the convex curve edge surface 15 that curved toward the inner wall of the transmission base along the dash line b and induce the fluid in the internal cavity 12 of the transmission base 11 to flow inward along the dash line A and flow along the convex curve edge surfaces 15 that curved toward the inner wall of the transmission base along the dash line b. The symmetrical arrangement of the through holes around the transmission base 11 and the symmetrical arrangement of the convex curve edge surfaces 15 and the emerging axis a of the through holes around the inner wall of the transmission base 11 causes the fluid flow on each convex curve edge surface flow in relay with each other to create fluid flow on the circumference of the inner wall of the transmission base along the dash line B, which is a part of the vortex generating chamber 5, with the Coanda effect, it creates a laminar swirling flow.

Figure 6:
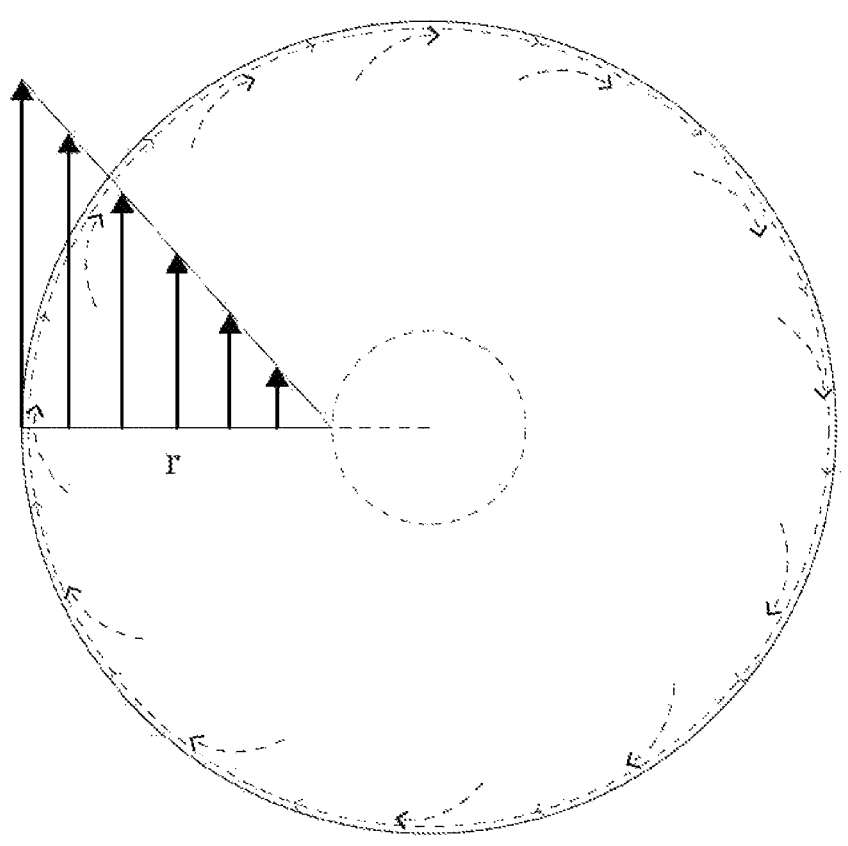
FIG. 6 is a layout of the forced vortex showing the velocity gradient profile/the centrifugal acceleration gradient profile.

According to FIG. 6, the circumference in FIG. 6 is the dash line flow B in FIG. 5, as the dynamic energy is maximized at the contact point of the convex curve edge surface 15 to the circumference of the inner wall of the chamber for generating vortex. The velocity of the vortex is therefore the highest at the convex curve edge surface 15, which is the outermost circumference of the vortex which shown as the circumference in FIG. 6. The velocity of the vortex gradually decreases as the vortex approaches the centre of the vortex in corresponding to the declining dynamic energy, such vortex is a forced vortex. Since the centrifugal force directly varies with the velocity of the vortex. The centrifugal acceleration gradient profile is generated by the forced vortex, the centrifugal force is highest at the outermost circumference, then decreases gradually as it approaches the centre of the vortex as shown in the layout of FIG. 6. The fluid particle distribution when come under the centrifugal force, the heavy phase fluid receive a higher rate of centrifugal force and are centrifuged into the outer circumference, while the light phase fluid is receive a lower rate of centrifugal force, thus circulates in the inner circumference. As a result of the vortex generated by the vortex generating device according to the present invention which is a laminar swirling flow, therefore, the particles are then separated into layers of distribution according to their density or size, large or small, in correlation with the generated centrifugal acceleration gradient profile, and is therefore easy to be separated.

According to FIG. 1, the vortex generating chamber 5 or part of the vortex generating chamber is a truncated conical shape, the circumference of the downstream cone open end is shorter than the circumference of the upstream cone open end causing the acceleration of the vortex and increase the centrifugal force along the longitudinal axis of the vortex generating chamber 5.

Figure 7:
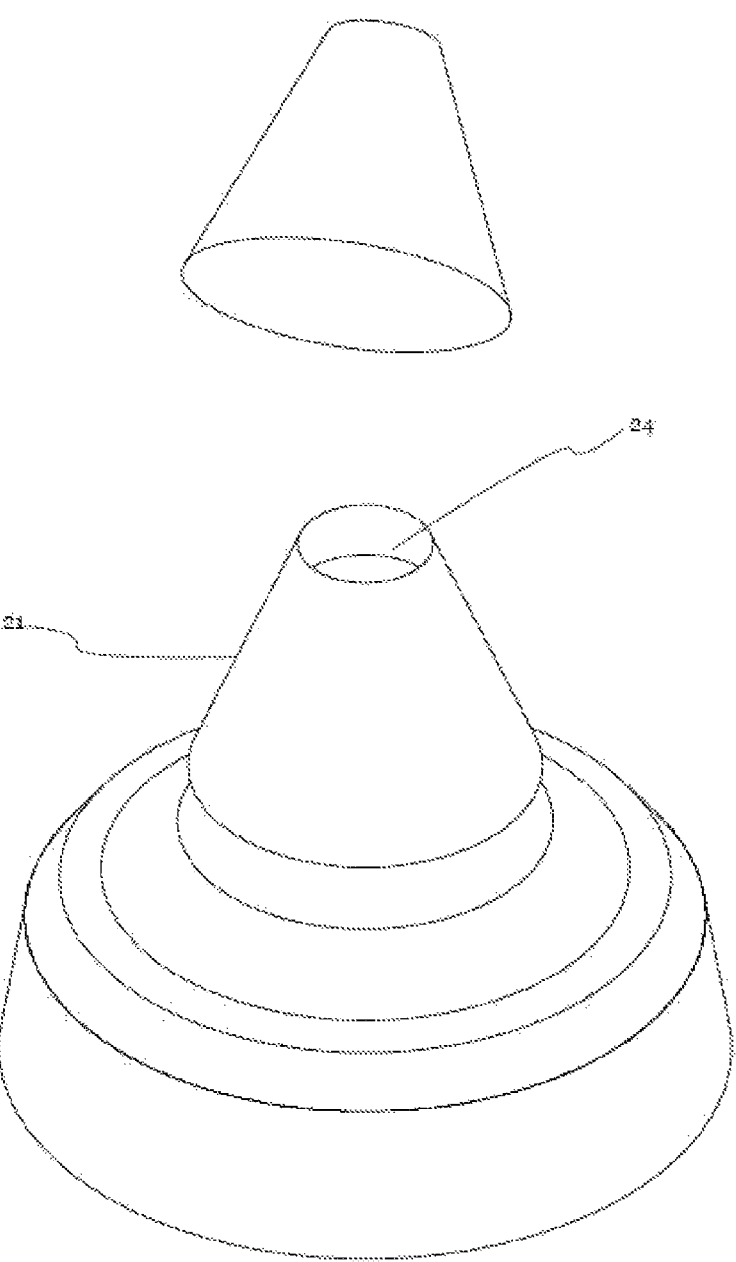
FIG. 7 shows stacked cones that installed next to the vortex generating chamber.
Figure 8:
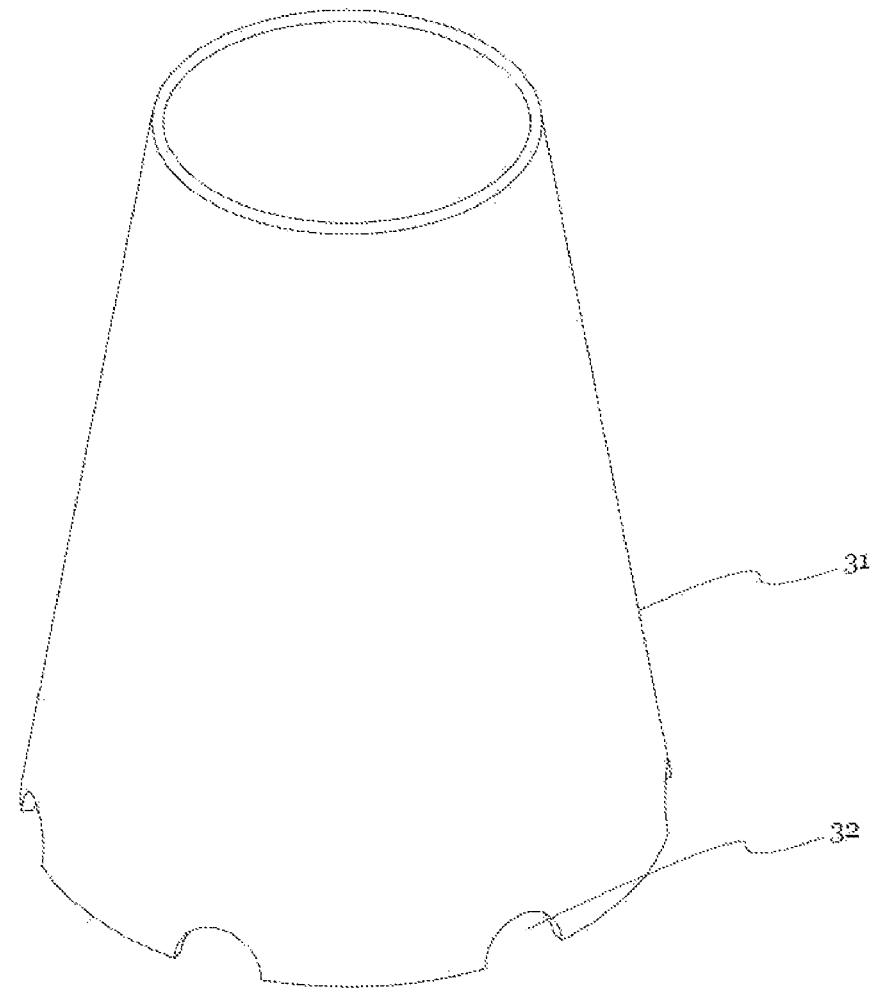
FIG. 8 shows a conical internal structure covering the stacked cones.

According to FIG. 1 and FIG. 7, next to the conical vortex generating chamber 5, there are stacked cones (at least one cone 21) with both upstream and downstream open ends. Each cone has protrusions to separate each cone to form narrow gaps (at least one gap 10) between the cones to increase the surface settling area. When the swirling fluid reaches the first stacked cone that adjacent to the open end of the chamber for generating vortex 7, with sudden longer circumference of the vortex because of the diameter of the subsequent cone 21 is longer than the diameter of the open end of the cone of the vortex generating chamber 5. The outer circumference vortex containing heavy phase fluid is centrifuged to swirl along the inner wall 9 of the next cone 21 and swirl down to the open end at the bottom of the cone then flows into a fluid collection channel 25 for heavy phase fluid, which is the gap at the bottom open ends of the stacked cones, which are the space between the conical internal structure 31 according to FIG. 1 and FIG. 8, which cover the stacked cones and the bottom open end of the stacked cones. The lighter phase fluid that previously swirl in the inner circumference will swirl outward to be outer circumference of the vortex will swirl forward to attach the next inclined inner wall surface 9 of the cone. It continues to circulate toward the downstream open end 24 of the cone. When the fluid swirl pass the inner wall 9 of the first stacked cone, the heavy phase fluid (compared with all swirling fluids) will be centrifuged to attach the inner wall 22 of the subsequent cone. The separating process mentioned above will repeated several times according to the number of stacked cones, the separating process will go on from the first stacked cone till the downstream open end of the last cone, which is the channel align with the outlet 34 of the external structure according to FIG. 9.

According to FIG. 1, the heavy phase fluid swirl downward from the gaps between the cones, then flows attaching to the inner wall of the internal cone structure 31 that covers the stacked cones. The fluid that swirl attaching to the inner wall of stacked cones and the inner wall 30 of the conical internal structure 31 that covers the stacked cones, part of the fluid particle is sedimented down to the storage chamber 35 for the heavy phase fluid which are the space between the conical or cylindrical external structure 33 according to FIG. 9 and the conical internal structure 31 that covers the stacked cones according to FIG. 8 through the outlet 32 at the bottom edge of the conical internal structure 31. The heavy phase fluid in the fluid storage chamber, which can be released via the outlet 36 wherein there may be an valve 37 that can release the fluid, either occasionally or continuously.

Figure 9:
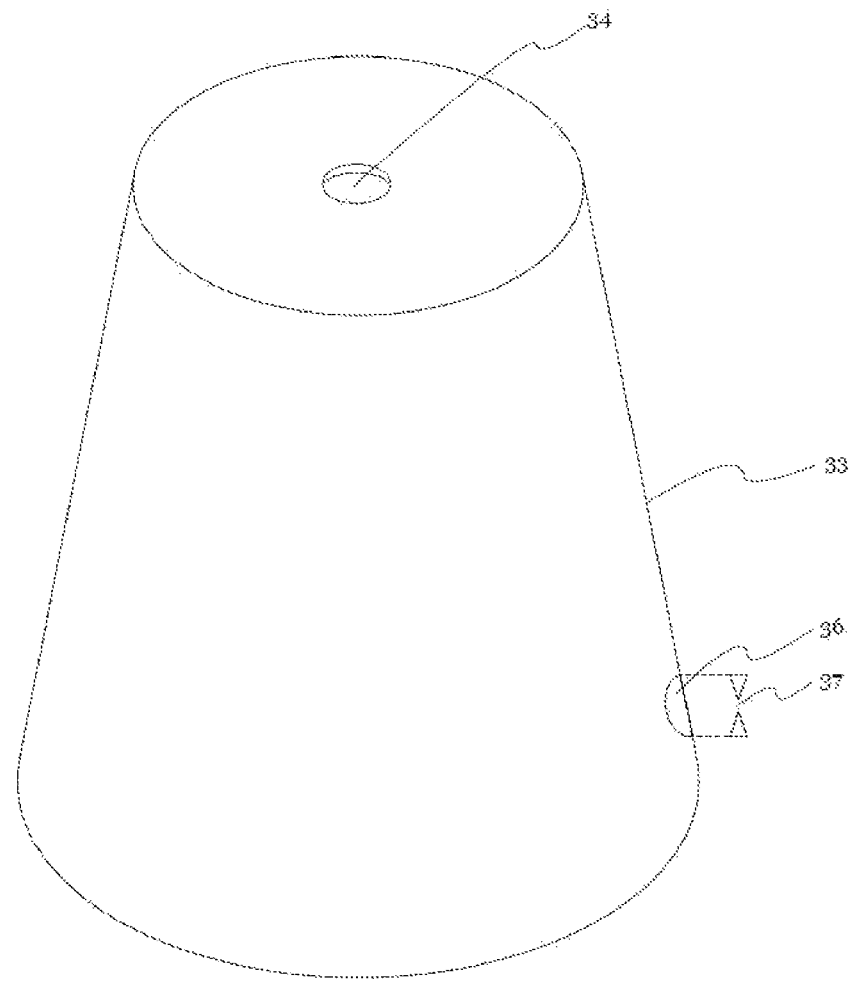
FIG. 9 shows a conical external structure of the cyclone fluid separator.

The unsettled fluid in the storage chamber for the heavy phase fluid will swirl upward to the upper part of the storage chamber for heavy phase fluid, where can be equipped with the outlet containing filter screen on the wall of the external structure 33 according to FIG. 9 to filter contaminated heavy phase fluid before it is released from the separator.

Figure 17A:
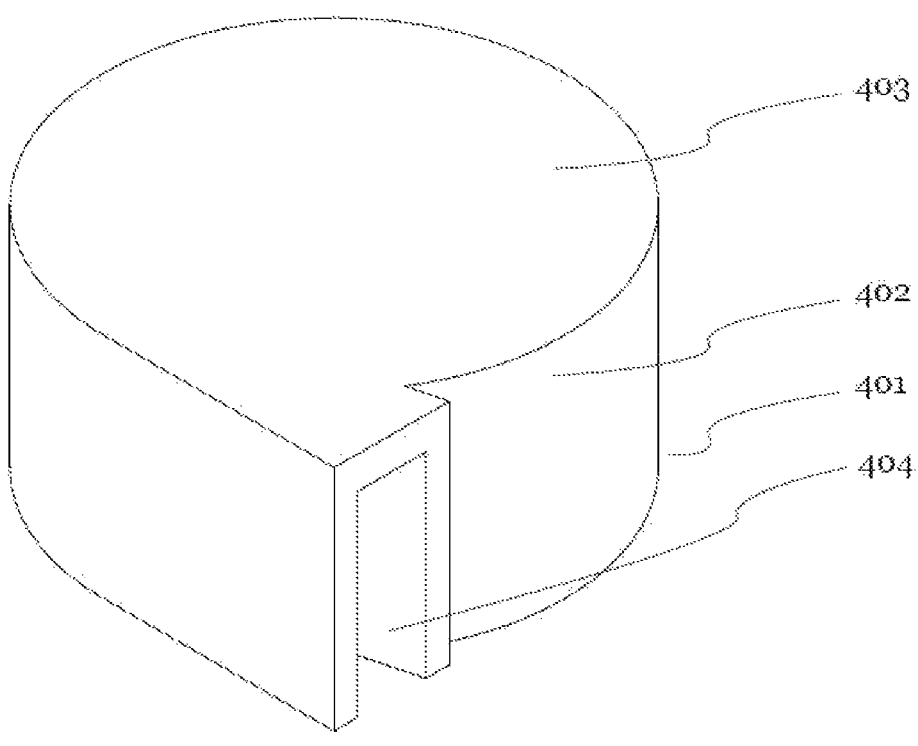
FIG. 17a shows a round box for covering the tube end having cap seal for shutting straight outlet to divert the flow through the lateral outlet.
Figure 17B:
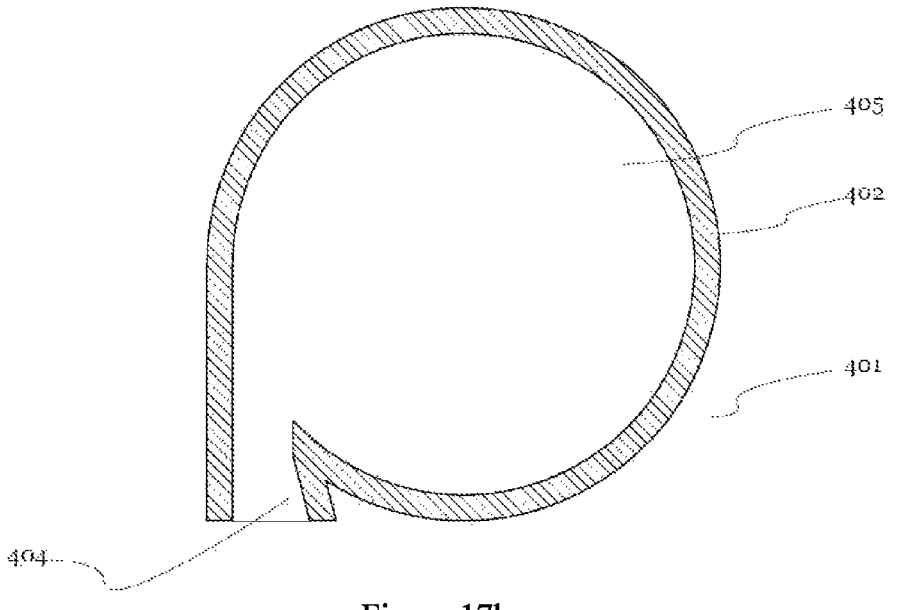
FIG. 17b shows a layout of the round box covering the straight outlet to divert the flow through the lateral outlet.

According to FIG. 1 and FIG. 17a, 17b, at the outlet 34 for light phase fluid or so called the fluid without contamination, a round tube with a cap seal 401 may be installed to close the straight-through outlet and open the side outlet 404 to shut the direct flow and deviate to swirl through the side outlet 404 to sustain the swirling flow in the chamber, for higher separation efficiency.

Figure 10:
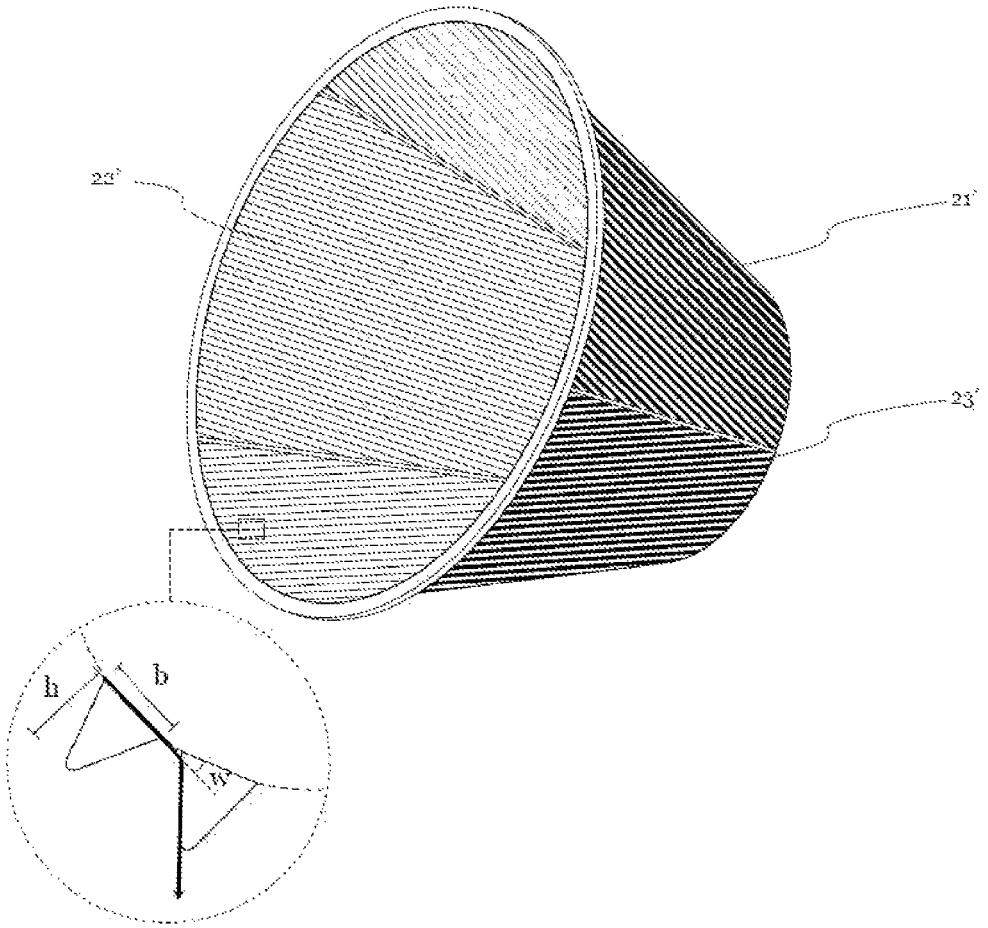
FIG. 10 shows a Coanda screen cone.

The stacked cones in the separator can be either solid-wall cones or Coanda screen cones according to FIG. 10. Coanda screen cone 21' consists of a conical structure covered with wedge wire as a wall, that is a wire with triangular cross-section plane, that is adhered longitudinally to the conical structure, having narrow gaps between the wedge wires. The gaps between the wedge wires are the same along the wire. The wedge wires are arranged around the cone with the flat side facing inward as the inner wall, and the pointed side of the triangle faces outward to be the outer wall of the cone. The wedge wires that placed around the cone, with the curvature of the circumference of the cone, the flat side of the next wedge wire have w degrees uprisen angle from the flat side of the previous wedge wire, resulting the fluid flow from the flat side of the previous wedge wire straight to the triangular side wall of the subsequent wedge wire, as shown in the solid line of flow. The heavy phase fluid that flows on the outer circumference of the vortex with the Coanda effect to flows along the flat side of wedge wire and flows directly to the triangular side wall of subsequent wedge wire, then flows out from the Coanda screen and flows into the gap between the next cone 23 according to FIG. 1 and then swirl into the collecting channel 25 for heavy phase fluid. The lighter phase fluid that previously swirl in the inner circumference of the vortex will swirl out to be outer circumference of the vortex in the Coanda screen cone and then consequently swirl to the next gap of the Coanda screen cone. The process of separating the heavy phase fluid from the light phase fluid (also known as removing contaminants) occurs at gaps and all layers of the stacked Coanda screen cones. Since the gap between the wedge wires of the outer wall is larger than the gap between the wedge wires of the inner wall, the Coanda screen is not easily clogged.

Figure 18:
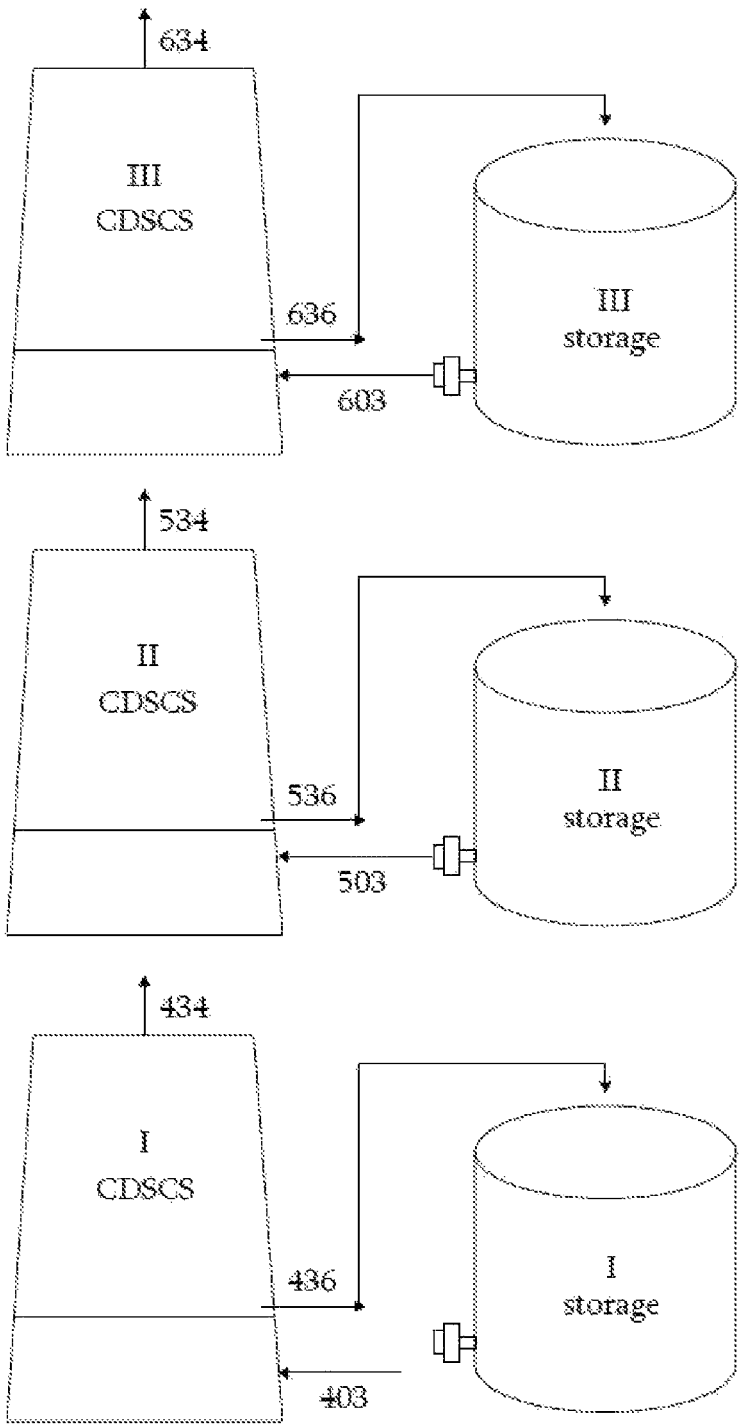
FIG. 18 shows a connection layout of cyclone fluid separators with stacked cones having a device for generating forced vortex with a laminar swirling flow that uses the Coanda effect principle.

According to FIG. 18, separation efficiency of the compact disc stack cyclone separator (CDSCS) according to the present invention can be optimized by connecting many sets of the compact disc stacked cyclone separators according to the present invention which using the devices which apply Coanda effect principle to generate a forced vortex with a laminar swirling flow at the inner walls of the vortex generating chamber. Especially, in the case of the fluid separation processes in industrial application. The fluid to be separated is imported into the separator at the inlet 403. After being separated from the separator 1 according to the present invention (CDSCS I), the heavy phase fluid is directed through the outlet 436 into storage tank 1 (storage I), while the light phase fluid continues to swirl to the next separator through cylindrical link tube that connects between the light phase fluid outlet of the first separator with the upstream inlet of the vortex generating chamber of the second separator (CDSCS II) that flows into the vortex generating chamber of the second separator (CDSCS II). The vortex is accelerated through the viscosity of the accelerating fluid and the accelerated fluid. The accelerating fluid is pumped into the inlet 503 with pressure that generating higher velocity vortex than the velocity generated by the device for generating vortex of the first separator 1 (CDSCS I). The heavy phase fluid that has been separated will be released from the outlet 536 into storage tank 2 (storage II), which will be continuously pumped back to accelerate the vortex through the inlet 503. The separation occurs with both the incoming fluid from the separator 1 (CDSCS I) and the accelerating fluid that stored in the storage tank 2 (storage II). When the separated fluid in the storage tank 2, become homogeneous in terms of particle size or density it will be released from the storage tank 2.

The separators can be connected as many as needed. The velocity of the vortex increases with each layer, as the velocity of the vortex is accelerated gradually increased. The centrifugal force generated will gradually be higher. Therefore, it is possible to separate fluids with very small particles and able to separate the fluid in each layer to obtain the desired particle sizes.

Figure 11:
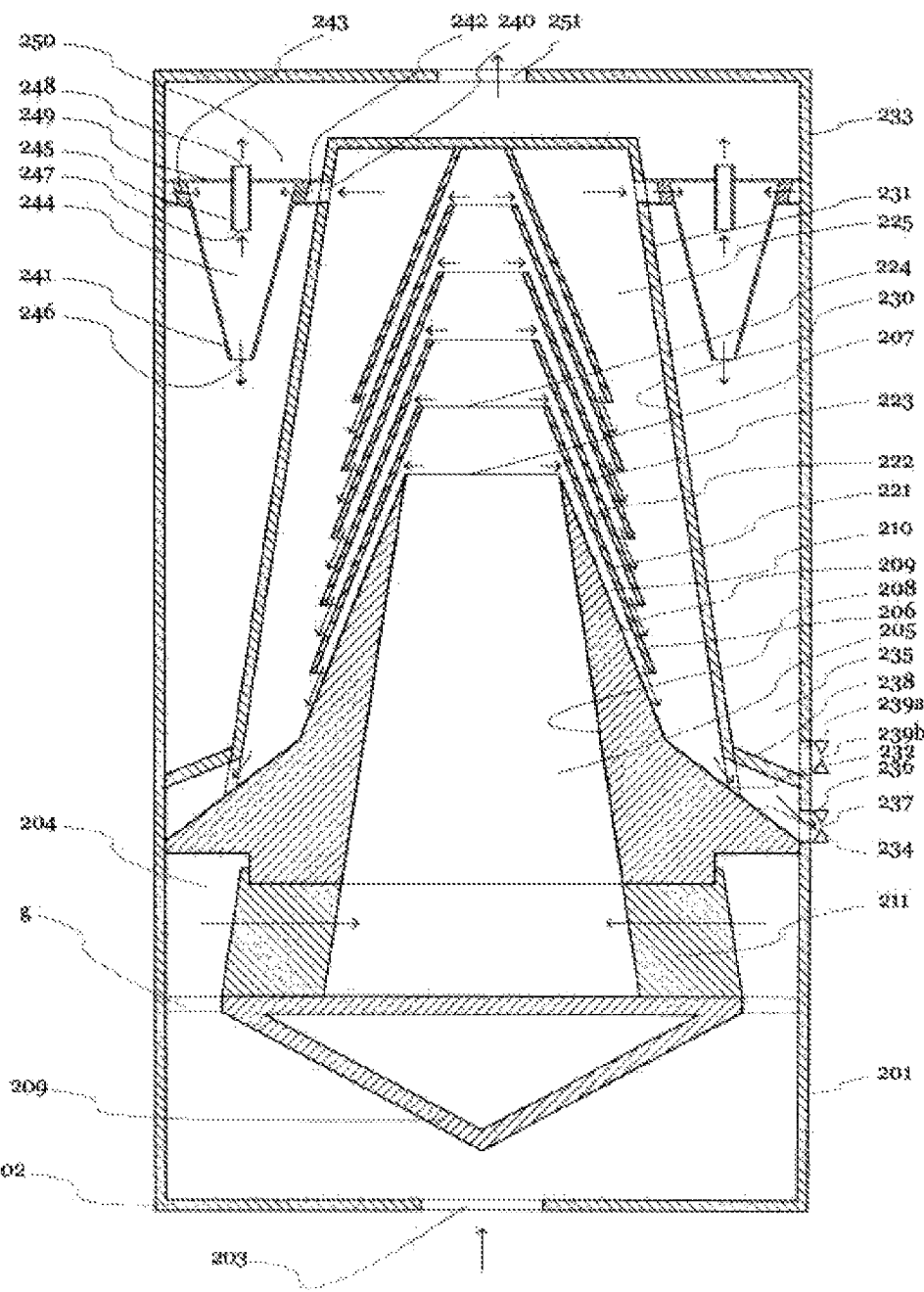
FIG. 11 shows a compact disc stack cyclone separator with small cyclone fluid separators in order to separate fine dust or fine fluid particles contaminated in the fluid.

According to FIG. 11, the compact disc stack cyclone separator according to the present invention, in which can be developed to another model which the outlet for unsettled fluid located above the storage chamber 35 for the heavy phase fluid to be cancelled, so filter cleaning or filter replacement not required (maintenance free). The compact disc stack cyclone separator according to the present invention, 201 comprises: the inlet 203 to guide fluid into the separator, the device for generating vortex 202 consisting of the fluid distribution chamber 204, the transmission base 211, the vortex generating chamber 205 which generating forced vortex with a laminar swirling flow that uses the Coanda effect principle, the stacked truncated cones (as least one cone 221) with the upstream and downstream open ends with protrusions on the cone wall to separate each cone, to form narrow gaps (at least one gap 223) between the cones to increase surface settling area, the fluid collection channel 225 for heavy phase fluid, the storage chamber 234 for heavy phase fluid, the outlet 236 for heavy phase fluid, the inlet 240 for introduction the lighter phase fluid which is left over from the sedimentation in the fluid collection channel for heavy phase fluid into the small cyclone fluid separator 241, the outlet 246 for heavy phrase fluid which located at the bottom of cone, the storage chamber 235 for contaminated fine particle, the outlet 251 for the cleaned fluid from the small cyclone fluid separator to be released to the outside.

According to FIG. 11, when the required separating fluid is imported to the separator 201 according to the present invention, the fluid is distributed through a conical body 209, to distribute the fluid through a meshed vent (g) to screen large contaminants before being released into the fluid distribution chamber 204 which surround the transmission base 211 to distribute the fluid into the transmission base 211.

According to FIG. 4, the transmission base 211 is similar to the transmission base 11, therefore we use the same figure to explain the transmission base 211, which has a conical shape with the internal cavity 12, with through hole 13, Which is multiple narrow vertical rectangle gaps symmetrically located around the transmission base 11, beside the through hole 13 that will be the through hole side edge block 14 with a sidewall 16 at the entrance of the through hole, at the through hole 13 that passes into the internal cavity 12, the part of the though hole side edge block 14 Inside the internal cavity is the convex curve edge surface 15 that curved toward the inner wall of the transmission base, The edge wall beside the through hole on the opposite side of edge wall 16 is the edge wall 17. The gaps between the edge wall 16 and the edge wall 17 is wide at the entrance and then narrower at the through hole 13 for better gathering the fluid to flow through the through hole 13. The through hole 13 is not flow in straight line with the edge wall 16, but aligned with the edge wall 17 to determine the emerging axis of the through holes.

According to FIG. 5, since the device for generating vortex 211 is similar to device for generating vortex 11, therefore, it is described in detail with FIG. 5. The convex curve edge surface 15 Which curves toward the inner wall of the transmission base is located as the surface closest to the emerging axis a of the through hole 13, when fluid with a certain pressure and/or a certain suction force flows through the through hole 13 will deflected by the Coanda effect to flow along the convex curve edge surface 15 that curved toward the inner wall of the transmission base along the dash line b, and induced the fluid in the internal cavity 12 of the transmission base 11 to entrain to the dash line A and flows along the convex curve edge surface 15 that curved toward the inner wall of the transmission base along the dash line b, thus causing the fluid to flow attaching to the inner wall of the transmission base, With symmetrically arrangement of the multiple of through holes 13, and convex curve edge surfaces 15 and the emerging axes a of the through holes around the inner wall of the transmission base 11. Therefore, the fluid flows on each convex curve surface 15 that curved into the inner wall of the transmission base. flows by relays of each other, thus flows on the circumference of the inner wall of the transmission base along the dash line B, then creates a vortex inside the internal cavity 12, which is part of the vortex generating chamber (according to FIG. 11). By Coanda effect the generated vortex is forced vortex with laminar swirling flow.

According to FIG. 6, where the dynamic energy is highest at the point of contact of the convex curve surface 15 to the circumference of the inner wall of the vortex generating chamber, the vortex velocity is therefore the highest at the convex curve edge surface 15, which is the outermost circumference of the vortex. That is the flow along the dash line B in FIG. 5, which shown as the circumference in FIG. 6. The vortex velocity gradually decreases as the vortex approaches the centre of the vortex as the dynamic energy decreases, such vortex is forced vortex. Since the centrifugal force directly varies with the vortex velocity, the centrifugal acceleration gradient profile generated by the forced vortex, the centrifugal force is highest at the outermost circumference, then decreases gradually as it approaches the centre of the vortex. As shown in the layout of FIG. 6, the fluid particle when come under the centrifugal force, the heavy phase fluid receive the centrifugal force at a higher rate are centrifuged to circulated at outer circumference. The light phase fluid receive centrifugal force at a lower rate circulated in the inner circumference. As a result of the vortex generated by the vortex generating device according to the present invention is a laminar swirling flow. The particles are then separated into layers of distribution according to their density or size which is corresponding to the generated centrifugal acceleration gradient profile, therefore easy to be separated.

According to FIG. 11, next to the conical shape vortex generating chamber 205, there are multiple of truncated cones (at least one cone 221) with upstream and downstream open-end that are stacked in axial direction. Each cone has protrusions to separate each cone to form narrow gap (at least one gap 210) between the cones to increase surface settling area. When the swirling fluid reaches the first cone 221 of stacked cones. The outer circumference of the swirling flow consists of the heavy phase fluid is swirl attach to the inner wall 209 of cone and swirl downward through the gap 210 between cones swirling toward the bottom outlet of the cone. It swirl into the fluid collection chamber 225 for heavy phase fluid, that is a gap at the bottom outlet of the stacked cone, which is the space between the bottom outlet of the stacked cone and the conical internal structure 231 which covers the stacked cone. While light phase fluid that previously swirl in the inner circumference of the vortex will swirl out to be outer circumference of the vortex will continue to swirl further to the next part of the inner wall surface 209 of the cone and will continue toward the downstream open end 224 of cone, as it swirl pass the inner wall of the first cone the heavier phase fluid (compare with all swirling fluids) will be thrown to the inner wall 222 of the subsequent cone. The above mentioned process will repeat over several times in accordance with the number of stacked cones. The separation occurs at the conical wall of the surface settling area at all layers. The heavy phase fluid is separated through narrow gaps between the cones into a fluid collection chamber 225 for heavy phase fluid. The vortex continues to swirl attach to the wall of the conical internal structure 231, wherein is another surface settling area, to sediment and drop through the outlet 232 of the conical internal structure to be stored at a fluid storage chamber 234 for heavy phase fluid, which has separation wall 238 to separate from the storage chamber 235 for contaminated fine particles, outlet 236 for heavy phase fluid, which may have valve 237 for the opening and closing to remove the large particles occasionally from the separator. The unsettled fluid will swirl upward above the fluid collection chamber 225 for heavy phase fluid, inlet 240 at the upper part of the inner wall 230 of the conical internal structure 231 that covers the stacked cones for introduction fluid into the fluid distribution chamber 242 to distribute the fluid into the small cyclone separator 241.

Figure 16:
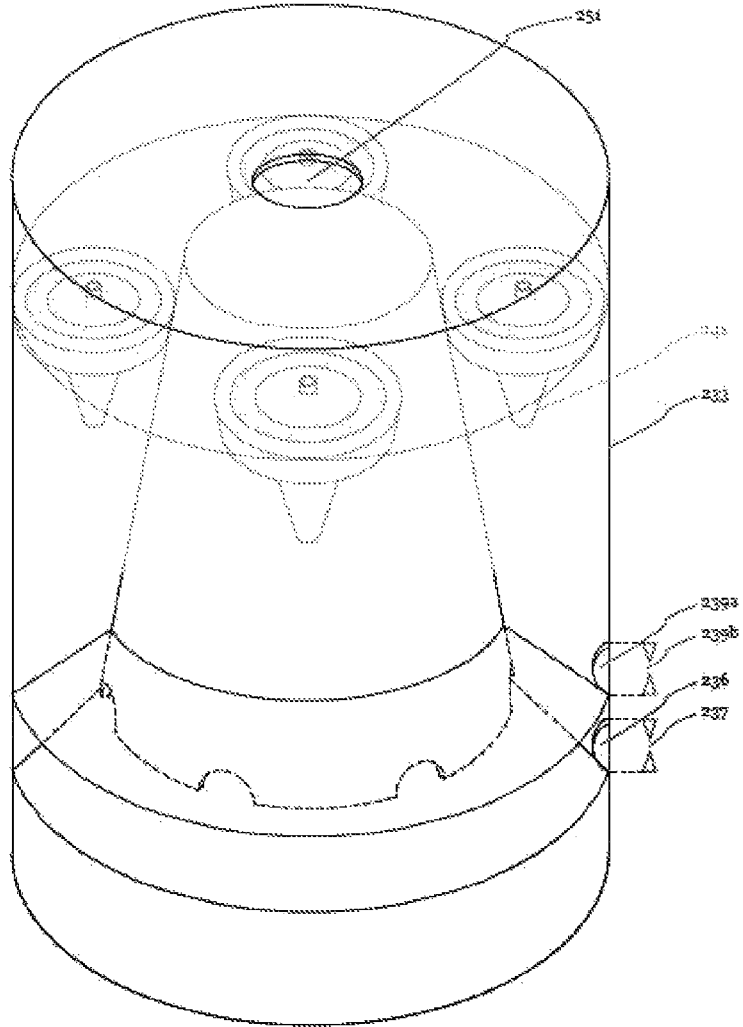
FIG. 16 shows a 3D image of a cyclone fluid separator with stacked cones having small cyclone fluid separators in order to separate fine dust or fine fluid particles contaminated in the fluid to reveal the components inside.

According to FIG. 16 and FIG. 11, several small cyclone fluid separators 241 are symmetrically mounted around the upper part of the outer wall of the conical internal structure 231, where is the space between the external structure 233 and the conical internal structure 231, there is partition 249 to separate the space to be the upper and lower part of the cyclone. The small cyclone fluid separator 241 is mounted on the partition 249. The vortex finder tube 245 of each cyclone have outlet 248 through to the upper space above the cyclone. The bottom outlet 246 of the cyclone, opens to the space under the cyclone, which is a storage chamber 235 for the separated fine contaminated particles.

Figure 12:
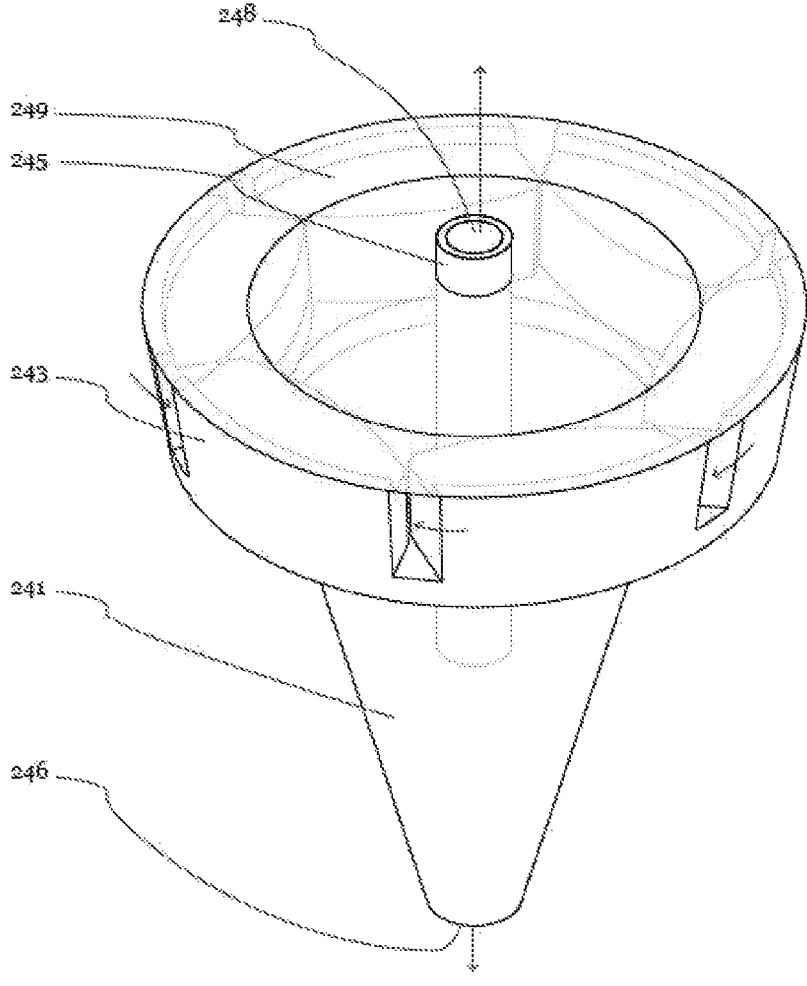
FIG. 12 shows a small cyclone fluid separator.
Figure 13A:
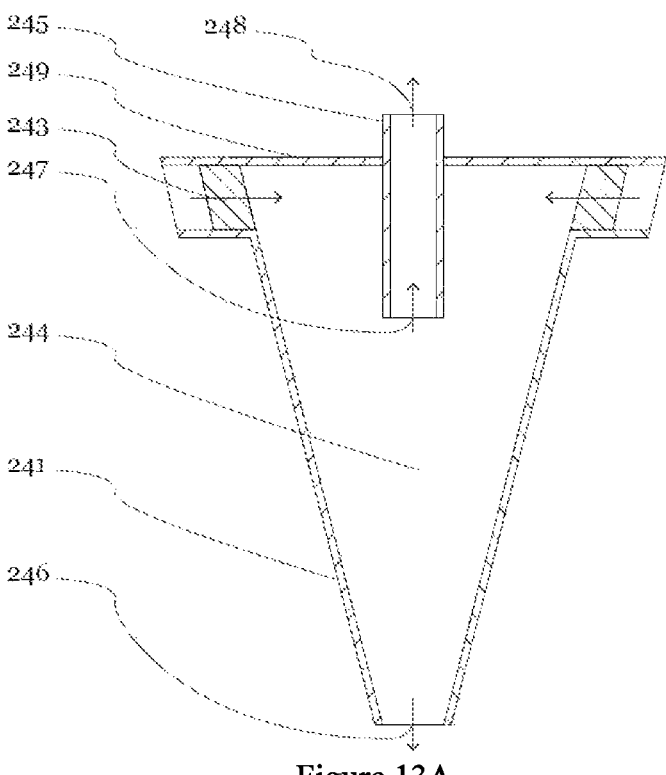
FIG. 13A shows an operation layout of a small cyclone fluid separator.
Figure 13B:
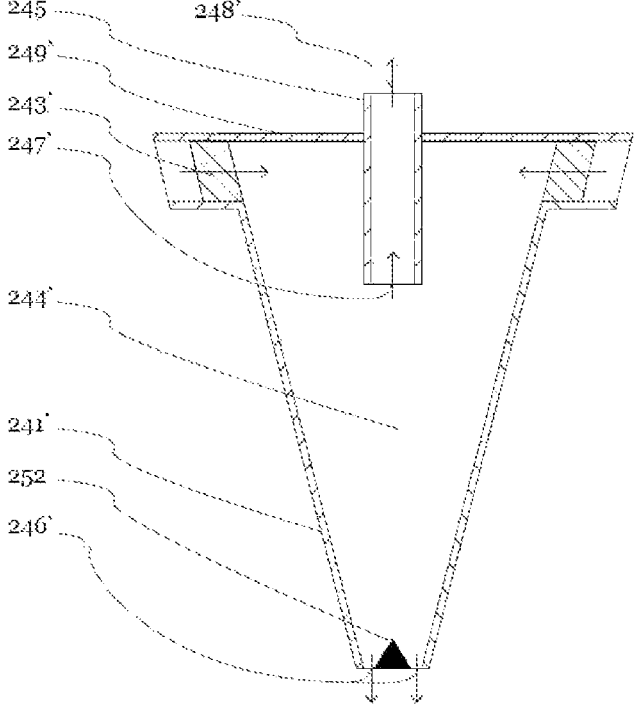
FIG. 13B shows an operation layout of a small cyclone fluid separator equipped with a conical apex at the center of the bottom outlet to facilitate the reverse flow.

According to FIG. 12 and FIG. 13A, small cyclone fluid separator 241 has an inverted cone shape comprises: a device for generating a vortex 243 which use the Coanda effect principle to generate a forced vortex with laminar swirling flow, has vortex generating chamber 244 which is in shape of inverted cone, an bottom outlet 246 of cyclone cone which is the outlet for heavy phase fluid, a vortex finder 245 that is a circular tube mounted in the center of the upper cover 249 of the cyclone, extending down into the vortex generating chamber, a vortex finder inlet 247, at the end of vortex finder outlet 248 is the outlet for cleaned fluid. According to FIG. 13B at the center of the bottom outlet 246' of the cyclone cone may have a conical apex body 252' for assisting swirling flow to reverse upward, at the widest part of its circumference is smaller than the circumference of the bottom outlet 246' of the cyclone to provide an annulus space as the bottom outlet 246' of the cyclone.

Figure 14:
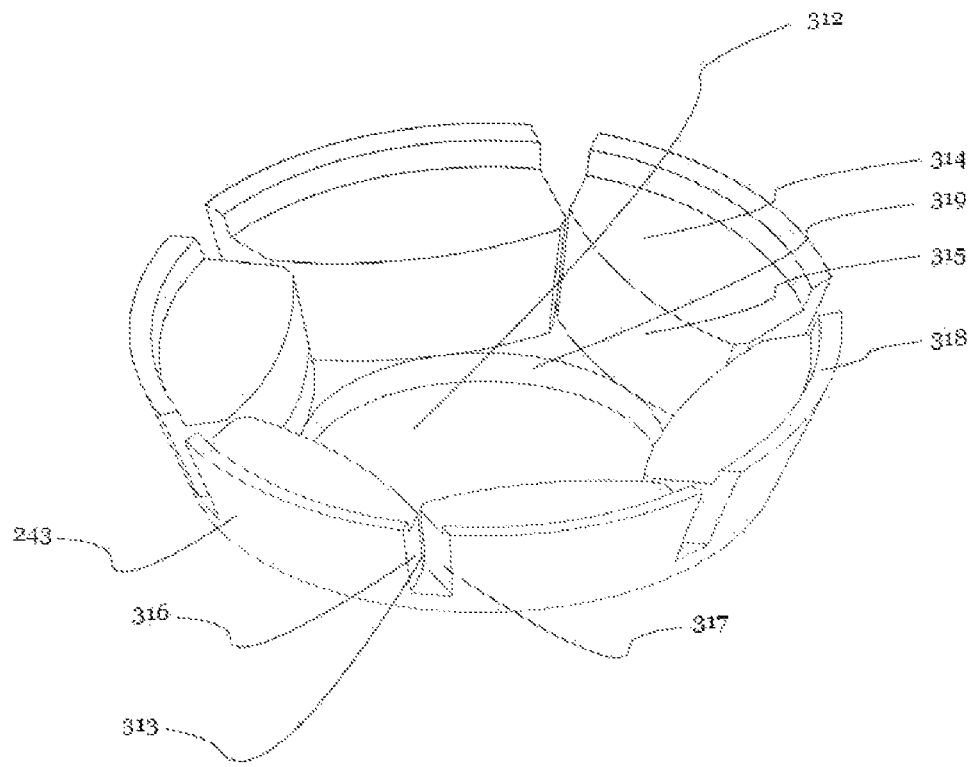
FIG. 14 shows the the upturn conical transmission base of a device for generating vortex for a small cyclone fluid separator.
Figure 15:
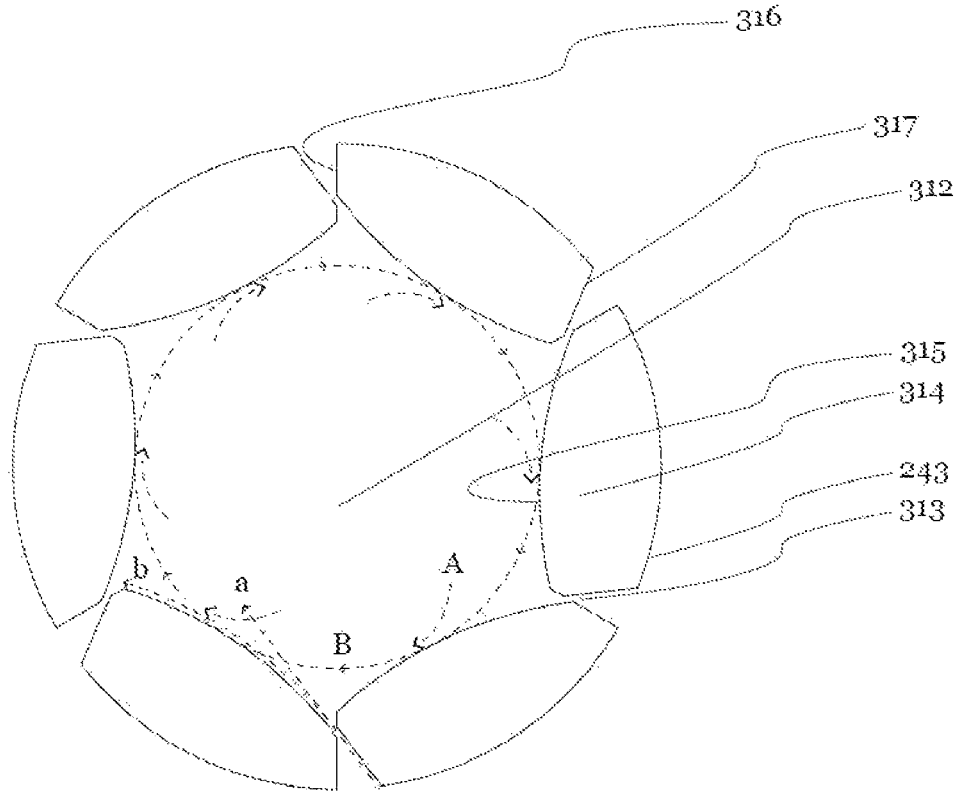
FIG. 15 shows an operation layout of the transmission base of a device for generating vortex of small cyclone separator.

According to FIG. 14 and FIG. 15, the device for generating vortex of the small cyclone separator comprises: an inverted conical transmission base 243, with a number of through holes 313. Which are symmetrically installed around the transmission base 243 by the side of the through holes is the through hole side edge block 314, hole side edge wall 316 at the entrance of the through hole 313, a hole side edge wall 317 on the opposite side of though hole side edge wall 316. The gap between the hole side edge wall 316 and hole side edge wall 317 will be wider at the entrance and narrows down as it approaches the through hole 313. The hole side edge wall 316 is not in a straight line through the internal cavity. The edge wall 317 will be aligned with the through hole 313, and to align with emerging axis a of the through hole. The though hole side edge wall inside the internal cavity will be the convex curve edge surface 315 that curved toward the inner wall of the transmission base. The convex curve edge surface 315 that curved toward the inner wall of the transmission base will be the surface closest to the emerging axis a of the through hole, in relative to the hole side edge wall on the other side at the inner outlet of the through hole, which is opposite the convex curve edge surface 315 that curved toward the inner wall of the transmission base.

According to FIG. 11, when the fluid has passed from the separation process from stacked cones, the heavy phase fluid swirl attaching to the surface settling area of the stacked cones, and the inner wall 230 of the conical inner structure 231 that covers the stacked cones, the fluid is sedimented and then collected in the bottom storage chamber that is the storage chamber for heavy phase fluid. The leftover fluid from the sedimentation or the fine contaminated fluid will swirl upward to above the fluid collection chamber 225 and then flows into the inlet 240 that directs the fluid into the fluid distribution chamber 242 to the multiple of small cyclone fluid separators (at least one small cyclone fluid separator 241) that installed symmetrically around the conical outer structure 231, which cover the stacked cones. To introduce the fluid into the fluid distribution chamber 242 then distribute into the transmission base of the device for generating vortex 243 of the small cyclone fluid separator.

According to FIG. 15, when the fluid flows through the through hole 313 of the transmission base of the device for generating vortex that uses the Coanda effect principle. By arranging the convex curve edge surface 315 that curved toward the inner wall of the transmission base to be the closet surface to the emerging axis a of the through hole in accordance with the Coanda profile, the flow though fluid will deflected to flow attaching the convex curve edge surface 315 that curved toward the inner wall of the transmission base, along the dash line b, and induce the fluid into the internal cavity 312 of the transmission base to entrain to flow inward along the dash line A and flow along the convex curve edge surface 315 that curved toward the inner wall of the transmission base, along the dash line b. With the symmetrical arrangement of the through holes 313, both the external and internal walls around the transmission base and arranged the convex curve edge surfaces 315 and the emerging axes a of the through hole around the inner wall of transmission base. This causes the fluid to flow on each convex curve edge surface that curved toward the inner wall of the transmission base to flow in relay of each convex curve edge surface. Thus creates a flow on the circumference of the inner wall of the transmission base along the dash line B, which is part of the inner wall of the chamber for generating vortex 244 of the cyclone separator according to FIG. 11. Due to the "Coanda effect" resulting a laminar swirling flow.

According to FIG. 6, since the device for generating vortex 243 of small cyclone fluid separator 241 has the same working principle as the device for generating vortex 11, therefore, FIG. 6 is used to explain. Since the dynamic energy is highest at the point of contact of the convex curve edge surface with the circumference of the inner wall of the vortex generating chamber. The vortex velocity is therefore highest at the convex curve edge surface, which is the outermost circumference of the vortex in FIG. 6, which is the flow along the dash line B in FIG. 15, vortex velocity is gradually decreasing as the swirling approaches the center of the vortex in corresponding with the reduced dynamic energy, it is a forced vortex type vertex. Since the centrifugal force directly varies with the vortex velocity. The centrifugal acceleration gradient profile generated by the forced vortex, the centrifugal force is highest at the outermost circumference, then decreases gradually as it approaches the centre of the vortex, which is in corresponding with the distribution of the particles when cone under the centrifugal force, that is heavy phase fluid receive higher centrifugal force is thrown to the outer circumference, while light phase fluid receive a lower rate of centrifugal force will flow in the inner circumference. Since the vortex generated by the device for generating vortex of the small cyclone separator according to the present invention is a laminar swirling flow. The fluid particle are then separated and distributed in layers according to their density or size, large or small in corresponding with the centrifugal acceleration gradient profile, therefore easy to be separated.

According to FIG. 11, since it is a small cyclone 241 the diameter of vortex generating chamber 244 is short, its vortex velocity is high then generate high centrifugal force, combined with the short radius of the vortex the swirling particles are easily thrown to the wall of the cyclone cone, which is the vortex generating chamber 244. Thus the sedimentation rate is high, the high velocity vortex that swirl in the inverted cone shape vortex generating chamber, due to the circumference of the vortex generating chamber is continuous shorten longitudinally from upstream to downstream thus the swirling velocity will be accelerated when swirl down to the bottom outlet 246, which is the outlet of the heavy phase fluid, also known as the fine contaminants in the contaminated fluid. The cross-sectional area of bottom outlet 246 is smaller than the total cross-sectional area of all the inlets of the transmission base of device for generating vortex of small cyclone separator that directs fluid into the chamber for generating vortex 244, caused the incoming fluid flow greater than the capacity of the bottom outlet 246 to release, resulting in upward reverse swirling. The heavy phase fluid, or also known as the fine contaminants, will be separated at the bottom outlet 246 into the storage chamber 235 for fine contaminants. There is an outlet 239a that may have a valve 239b to remove fine contaminants from the separator. The light phase fluid, or cleaned fluid, swirl upward to the top of the cyclone swirl through the inlet 247 of the vortex finder, then swirl through the outlet 248 of the vortex finder 245 that is centered on the upper cover 249 of the cyclone cone. The cleaned fluid from each small cyclone fluid separator is gathered at the cleaned fluid collection chamber 250. Then released out via the outlet 251.

According to FIGS. 17a and 17b, at the outlet of the vortex finder may be fitted with a round tube with a cap seal 401 to close the straight outlet of the vortex finder and open the lateral outlet 404 to shut the direct flow and deviate the flow through the lateral outlet 404, helping to stabilize the vortex in the vortex generating chamber for higher separation efficiency.

The invention claimed is:

1. A compact disc stack cyclone separator comprising:
a fluid inlet either lateral inlet or axial inlet;
a vortex generator which generates a forced vortex;
a conical or cylindrical vortex generating chamber; and
an apparatus for separating fluid consist of:
a separation chamber which is a cavity formed by downstream open ends of stacked truncated cones;
narrow gaps between the stacked truncated cones, wherein:
an upstream part of the separation chamber is connected axially with the conical or cylindrical vortex generating chamber, and
the stacked truncated cones are stacked in a manner that:
the stacked truncated cones are overlapped to be walls of the narrow gaps between the stacked truncated cones;
a part of a downstream section of each of the stacked truncated cones is part of a wall of the separation chamber;
a length of each of the narrow gaps between the stacked truncated cones is longer than a length of an inner wall of the downstream section of each of the stacked truncated cones that is exposed to the separation chamber;
a collecting channel for heavy phase fluid from the narrow gaps between the stacked truncated cones which is disposed about outlets of the narrow gaps between the stacked truncated cones at upstream open end of the stacked truncated cones to channel the heavy phase fluid to a storage chamber of the heavy phase fluid; and
an outlet for the heavy phase fluid to flow out from the storage chamber of the heavy phase fluid, while an outlet of light phase fluid is annexed to a downstream open end of a last stacked truncated cone which is a downstream open end of the separation chamber,
wherein the vortex generator generates the forced vortex with a laminar swirling flow using a Coanda effect principle,
wherein the vortex generator comprises:
a transmission base with an internal cavity that is connected to the conical or cylindrical vortex generating chamber of the compact disc stack cyclone separator;
a fluid distribution chamber to distribute the fluid into the transmission base; and
the fluid inlet of the compact disc stack cyclone separator that guides the fluid into the fluid distribution chamber, wherein the transmission base includes:
through holes connecting the internal cavity of the transmission base to the fluid distribution chamber;
through hole side edges blocks; and
convex curve edge surfaces that curve toward the inner wall of the transmission base in which the convex curve edge surface is the convex curve edge surface closest to an emerging axis of the through hole,
wherein the through holes, the through hole side edges blocks, and the convex curve edge surfaces are installed symmetrically around the transmission base both on an outer wall and an inner wall.

2. The compact disc stack cyclone separator according to claim 1,
wherein the fluid inlet of the compact disc stack cyclone separator is the axial inlet,
wherein the vortex generator generates the forced vortex with a laminar swirling flow,
wherein the vortex generator comprises guide vanes that are installed axially in the fluid inlet before the conical or cylindrical vortex generating chamber,
wherein the guide vanes are spiraled in the direction and the degree that can generate the forced vortex with a laminar swirling flow.

3. The compact disc stack cyclone separator according to claim 1,
wherein the vortex generator comprises impellers that are installed axially in the fluid inlet before the conical or cylindrical vortex generating chamber,
wherein the multiple blades of the impellers are spiraled in the direction and the degree that can generate the forced vortex.

4. The compact disc stack cyclone separator according to claim 1,
wherein the downstream open end of a most downstream stacked truncated cone is smaller than the downstream open end of a most upstream stacked truncated cone so that a conical cavity chamber is formed inside the stacked truncated cones in order to distribute the fluid to swirl downward through all the narrow gaps between the stacked truncated cones.

5. The compact disc stack cyclone separator according to claim 1,
wherein a cone wall of each of the stacked truncated cones is solid wall.

6. The compact disc stack cyclone separator according to claim 1,
wherein each of the stacked truncated cones is a Coanda screen cone in which its wall is covered with wedge wire which its cross-sectional plan is a triangular shape, adhered longitudinally to a cone structure
wherein a flat side of the wedge wire is facing inward and functioned as the inner wall of each of the stacked truncated cones,
wherein a triangular side of the wedge wire is facing outward and functioned as the outer wall of each of the stacked truncated cones,
wherein the wedge wire is mounted around each of the stacked truncated cones leaving a narrow gap between two adjacent wedge wires, and because of a curvature of a circumference of each of the stacked truncated cones, the flat side of a next wedge wire has an uprisen angle from the flat side of a previous wedge wire.

7. The compact disc stack cyclone separator according to claim 1,
wherein at an upper part of the storage chamber for the heavy phase fluid, an outlet with a filter screen or filter element is installed on a wall of an outer structure to filter the heavy phase fluid before releasing from the compact disc stack cyclone separator.

8. The compact disc stack cyclone separator according to claim 1, wherein at the outlet for the light phase fluid, a round tube with a cap seal is installed to close a straight outlet and opens a lateral outlet at a side of the round tube.

9. The compact disc stack cyclone separator according to claim 1, wherein the fluid inlet of the compact disc stack cyclone separator is the lateral inlet, wherein the vortex generator generates the forced vortex with a laminar swirling flow that uses a Coanda effect principle, wherein the vortex generator comprises:

a fluid inlet that guides the fluid into a fluid distribution chamber to distribute into a transmission base including: through holes to guide the fluid into the internal cavity of the transmission base which is a part of a conical or a cylindrical chamber for generating vortex; through hole side edges blocks; and convex curve edge surfaces that curved toward the inner wall of the transmission base in which the convex curve edge surface is the convex curve edge surface closest to the emerging axis of the through hole, the through holes, the through hole side edges blocks, and the convex curve edge surfaces being installed symmetrically around the transmission base both on the outer wall and the inner wall, and wherein the compact disc stack cyclone separator is configured to connect to a subsequent compact disc stack cyclone separator to increase separation efficiency, by connecting the fluid outlet of the light phase fluid of the compact disc stack cyclone separator, via a fluid pump, into an inlet of the subsequent compact disc stack cyclone separator wherein the fluid pump:

accelerates a swirling velocity of the subsequent compact disc stack cyclone separator to be higher than a swirling of the compact disc stack cyclone separator, generates a higher centrifugal force to increase the separation efficiency, and wherein the heavy phase fluid that is separated from the subsequent compact disc stack cyclone separator is removed from an outlet into a second storage, and wherein the heavy phase fluid in the second storage is continuously pumped back to the inlet of the subsequent compact disc stack cyclone separator to accelerate the swirling.

\* \* \* \* \*